United States Patent
Murakami et al.

(10) Patent No.: US 10,457,109 B2
(45) Date of Patent: Oct. 29, 2019

(54) VEHICLE HEIGHT ADJUSTMENT DEVICE

(71) Applicant: Showa Corporation, Gyoda-shi (JP)

(72) Inventors: Yosuke Murakami, Fukuroi (JP);
Fumiaki Ishikawa, Fukuroi (JP);
Hiroyuki Miyata, Fukuroi (JP)

(73) Assignee: Showa Corporation, Gyoda-shi (JP)

( * ) Notice: Subject to any disclaimer, the term of this patent is extended or adjusted under 35 U.S.C. 154(b) by 410 days.

(21) Appl. No.: 15/203,453

(22) Filed: Jul. 6, 2016

(65) Prior Publication Data

US 2017/0021688 A1    Jan. 26, 2017

(30) Foreign Application Priority Data

Jul. 23, 2015  (JP) ................................. 2015-145595

(51) Int. Cl.
*B60G 17/00*   (2006.01)
*B60G 17/019*  (2006.01)
(Continued)

(52) U.S. Cl.
CPC ....... *B60G 17/0155* (2013.01); *B60G 17/019* (2013.01); *B60G 17/0157* (2013.01);
(Continued)

(58) Field of Classification Search
CPC ............................ B60G 17/00; B60G 17/0155; B60G 17/0157; B60G 17/019
See application file for complete search history.

(56) References Cited

U.S. PATENT DOCUMENTS 4,526,401 A * 7/1985 Kakizaki ................. F16F 9/468
                                                     188/266.4
4,568,101 A   2/1986 Bleustein et al.
(Continued)

FOREIGN PATENT DOCUMENTS

JP    01-212686 A    8/1989
JP    02-136318 A    5/1990
(Continued)

OTHER PUBLICATIONS

Extended European Search Report dated Nov. 24, 2016 for the corresponding European Patent Application No. 16179297.3.
(Continued)

*Primary Examiner* — Barry Gooden, Jr.
(74) *Attorney, Agent, or Firm* — Leason Ellis LLP

(57) ABSTRACT

A vehicle height adjustment device includes an actuator, a detector, and a controller. The actuator is driven when supplied with a current and is configured to change a relative position of a body of a vehicle relative to an axle of a wheel of the vehicle. The detector is configured to detect the relative position. The controller is configured to control the current supplied to the actuator to make the relative position a target value so as to adjust a vehicle height of the body. When a detection value of the detector is smaller than the target value of the relative position, the controller is configured to alternately supply an increase current and a maintenance current to the actuator. The increase current increases the relative position to increase the vehicle height. The maintenance current maintains the relative position to maintain the vehicle height.

12 Claims, 19 Drawing Sheets

(51) Int. Cl.
*B60G 17/015* (2006.01)
*B60G 17/027* (2006.01)

(52) U.S. Cl.
CPC ...... *B60G 17/0272* (2013.01); *B60G 2202/42* (2013.01); *B60G 2300/12* (2013.01); *B60G 2500/30* (2013.01); *B60G 2600/182* (2013.01); *B60G 2800/914* (2013.01)

(56) References Cited

U.S. PATENT DOCUMENTS

| | | | | |
|---|---|---|---|---|
| 4,936,423 | A * | 6/1990 | Karnopp | B60G 17/0152 137/625.47 |
| 5,041,977 | A * | 8/1991 | Kawabata | B60G 17/0185 280/5.501 |
| 5,195,772 | A * | 3/1993 | Bachrach | B60G 17/0152 280/124.16 |
| 5,652,704 | A * | 7/1997 | Catanzarite | B60N 2/501 248/550 |
| 5,654,621 | A * | 8/1997 | Seelig | B60L 11/182 320/108 |
| 6,202,010 | B1 | 3/2001 | Shono et al. | |
| 8,844,944 | B1 * | 9/2014 | Murakami | B60G 17/016 280/5.514 |
| 9,115,734 | B2 * | 8/2015 | Murakami | F15B 15/20 |
| 9,511,816 | B2 * | 12/2016 | Murakami | B62K 25/04 |
| 9,676,376 | B2 * | 6/2017 | Masuda | B60T 7/22 |
| 9,738,346 | B2 * | 8/2017 | Kasuga | B62K 25/04 |
| 9,776,683 | B2 * | 10/2017 | Kasuga | B60G 17/0185 |
| 2004/0003788 | A1 * | 1/2004 | Taylor | F01L 1/022 123/90.15 |
| 2008/0246430 | A1 * | 10/2008 | Yanagihara | B60K 7/0007 318/799 |
| 2014/0077465 | A1 | 3/2014 | Murakami et al. | |
| 2014/0083093 | A1 | 3/2014 | Murakami et al. | |
| 2014/0191491 | A1 | 7/2014 | Lüde et al. | |
| 2016/0280312 | A1 * | 9/2016 | Kasuga | B62K 25/04 |
| 2016/0280313 | A1 * | 9/2016 | Kasuga | B62K 25/04 |
| 2016/0288867 | A1 * | 10/2016 | Murakami | F16F 9/3292 |
| 2017/0036503 | A1 * | 2/2017 | Murakami | B62K 25/06 |
| 2017/0267047 | A1 * | 9/2017 | Ikeda | B60G 17/019 |
| 2017/0274721 | A1 * | 9/2017 | Kasuga | B60G 17/016 |
| 2017/0274722 | A1 * | 9/2017 | Kasuga | B60G 17/016 |
| 2017/0282668 | A1 * | 10/2017 | Morita | B60G 17/002 |
| 2018/0105008 | A1 * | 4/2018 | Zuscik | B60G 17/0157 |

FOREIGN PATENT DOCUMENTS

| | | |
|---|---|---|
| JP | 02-279417 A | 11/1990 |
| JP | 08-022680 B | 3/1996 |
| JP | 08-303628 A | 11/1996 |
| JP | 2014-058260 A | 4/2014 |

OTHER PUBLICATIONS

Office Action dated Dec. 25, 2018 for the corresponding Japanese Patent Application No. 2015-145595 (an English translation attached hereto).

* cited by examiner

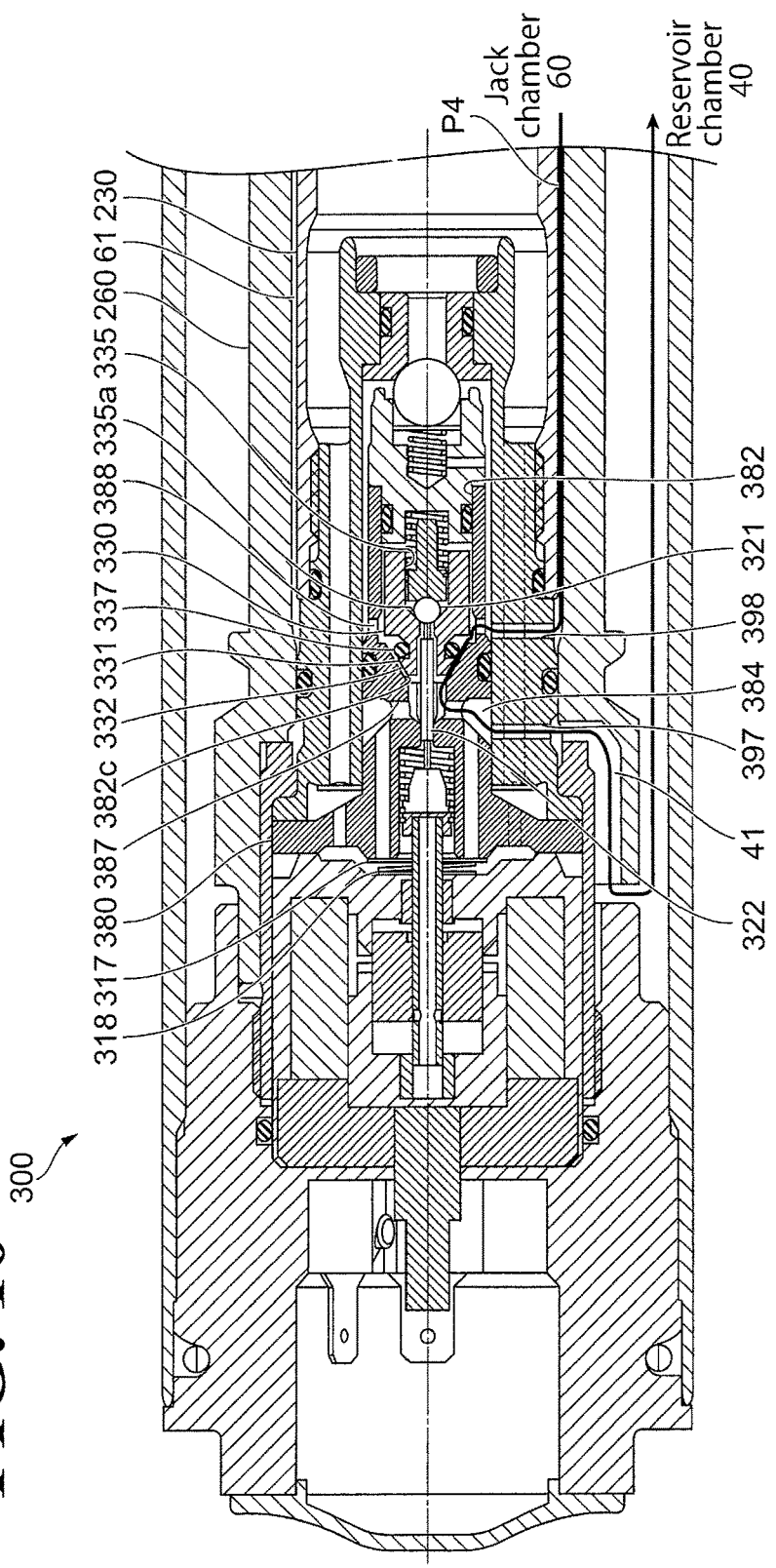

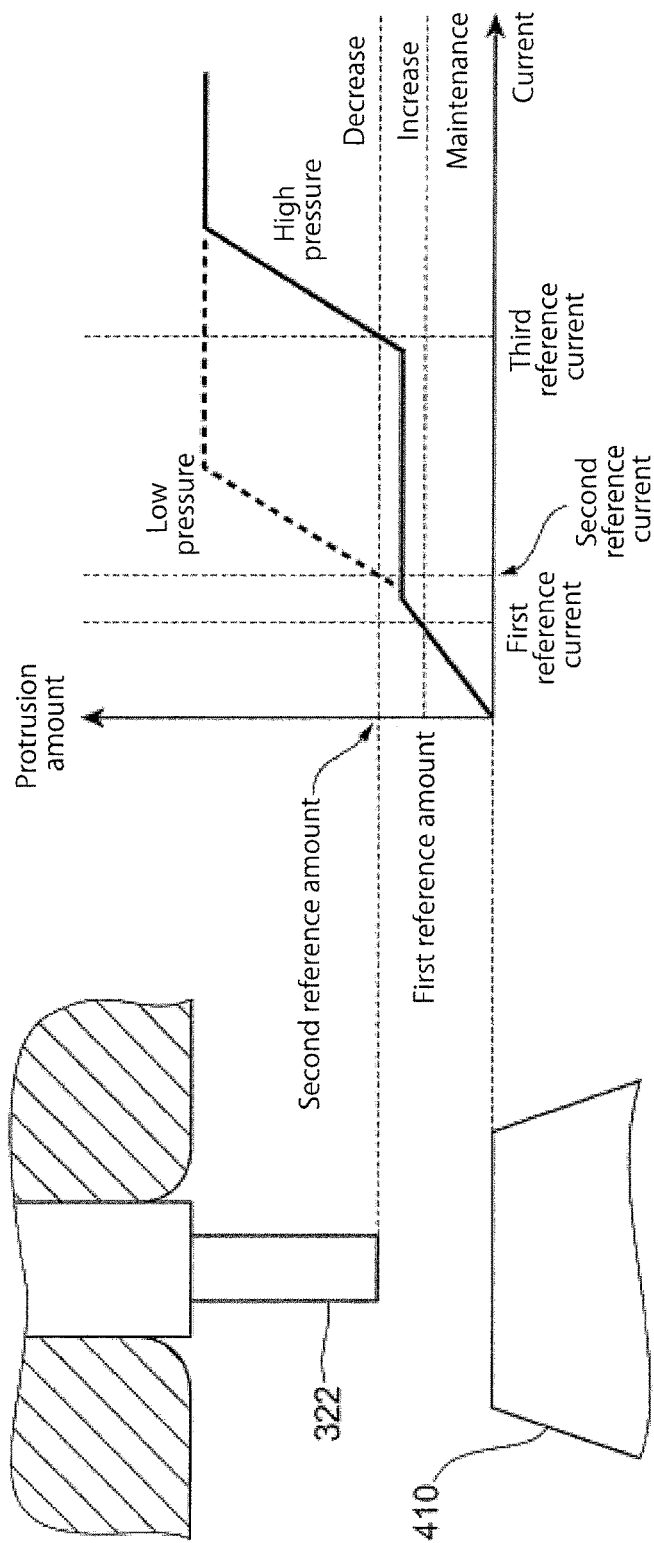

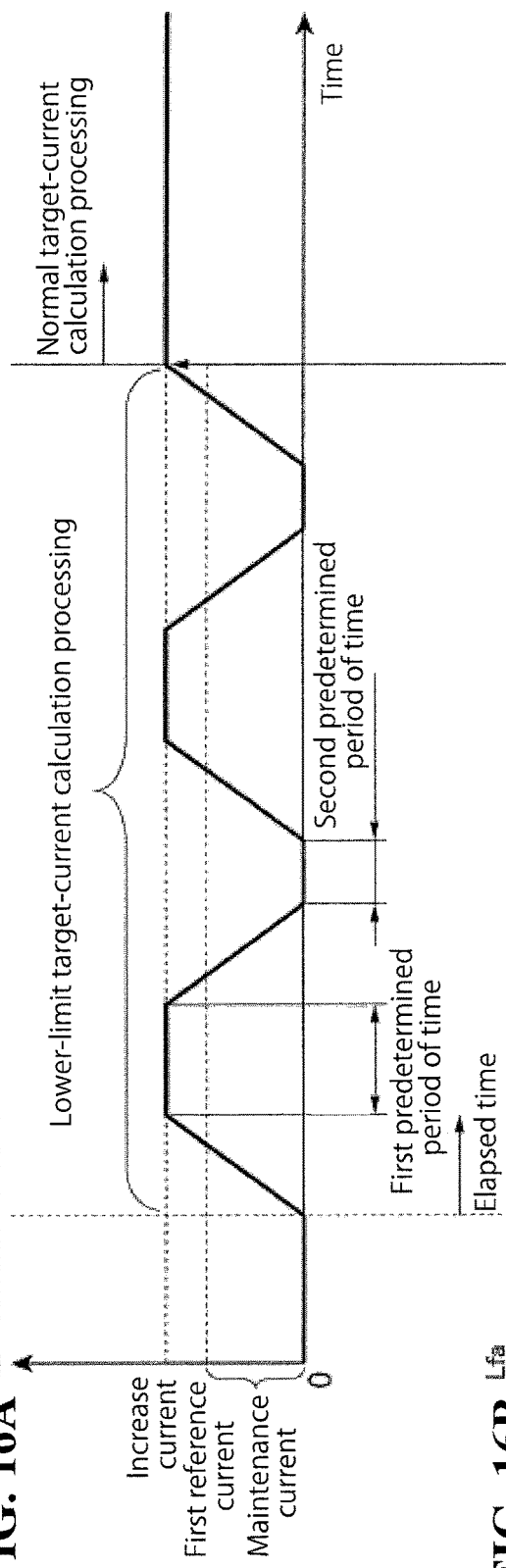
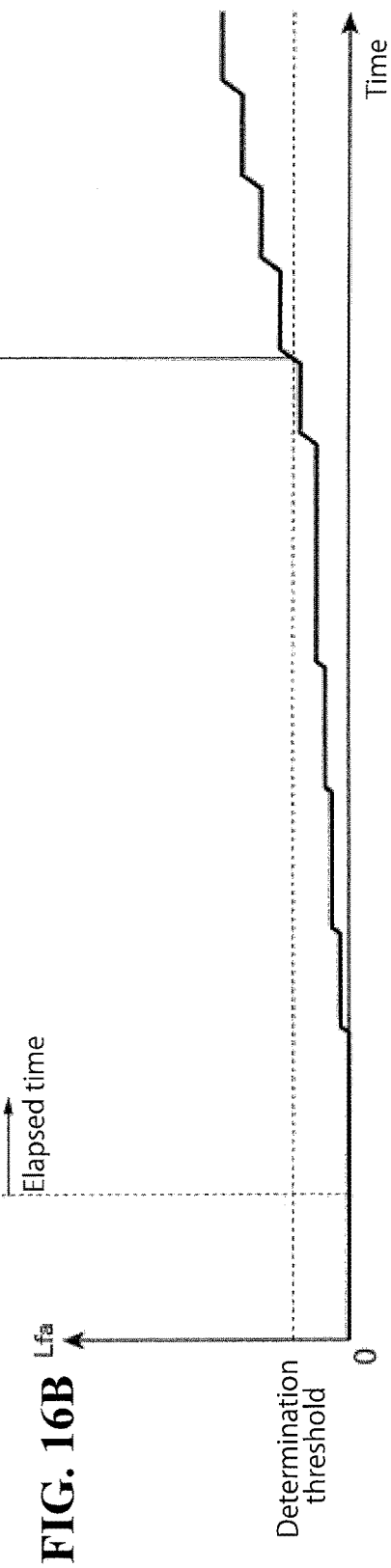
FIG. 16A
FIG. 16B

VEHICLE HEIGHT ADJUSTMENT DEVICE

CROSS-REFERENCE TO RELATED APPLICATIONS

The present application claims priority under 35 U.S.C. § 119 to Japanese Patent Application No. 2015-145595, filed Jul. 23, 2015. The contents of this application are incorporated herein by reference in their entirety.

BACKGROUND

Field

The present disclosure relates to a vehicle height adjustment device.

Related Art

Japanese Examined Patent Publication No. 8-22680 discloses a vehicle height adjustment device that increases the height of a motorcycle during travel and that decreases the height of the motorcycle during halt in order to facilitate a rider's or a passenger's getting on and off the motorcycle.

The vehicle height adjustment device automatically changes the height of the motorcycle in response to its speed of travel. Specifically, the vehicle height adjustment device automatically increases the height of the motorcycle when its speed reaches a set speed, and automatically decreases the height of the motorcycle when its speed changes to or below a set speed. In the adjustment of the height of the motorcycle, an electromagnetic actuator is driven into operation.

Current supplied to a changer (such as the electromagnetic actuator) to adjust the vehicle height is controlled to operate the changer. As the amount of operation of the changer increases, the vehicle height adjustment device switches from a vehicle height maintaining state to a vehicle height increasing state and to a vehicle height decreasing state. With this configuration, even if the amount of current supplied to the changer is the same, the load on the changer causes the amount of operation to vary. Consequently, even if current is supplied to implement the vehicle height increasing state, the load on the changer may be so small that the vehicle height adjustment device will be in the vehicle height decreasing state. When the vehicle height adjustment device switches to the vehicle height decreasing state even though current is supplied to implement the vehicle height increasing state so as to increase the vehicle height, controlling the changer to increase the vehicle height fails to increase the vehicle height.

SUMMARY

According to one aspect of the present disclosure, a vehicle height adjustment device includes an actuator, a detector, and a controller. The actuator is driven when supplied with a current and is configured to change a relative position of a body of a vehicle relative to an axle of a wheel of the vehicle. The detector is configured to detect the relative position. The controller is configured to control the current supplied to the actuator to make the relative position a target value so as to adjust a vehicle height of the body. When a detection value of the detector is smaller than the target value of the relative position, the controller is configured to alternately supply an increase current and a maintenance current to the actuator. The increase current increases the relative position to increase the vehicle height. The maintenance current maintains the relative position to maintain the vehicle height.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 10 illustrates a flow of oil in the front-wheel passage switch unit in a fourth switch state;

FIG. 15 illustrates a relationship between an amount of protrusion of an operation rod and a current supplied to a front-wheel solenoid;

FIGS. 16A and 16B illustrate lower-limit target-current calculation processing performed by a front-wheel target current determiner;

DESCRIPTION OF THE EMBODIMENTS

Figure 1:
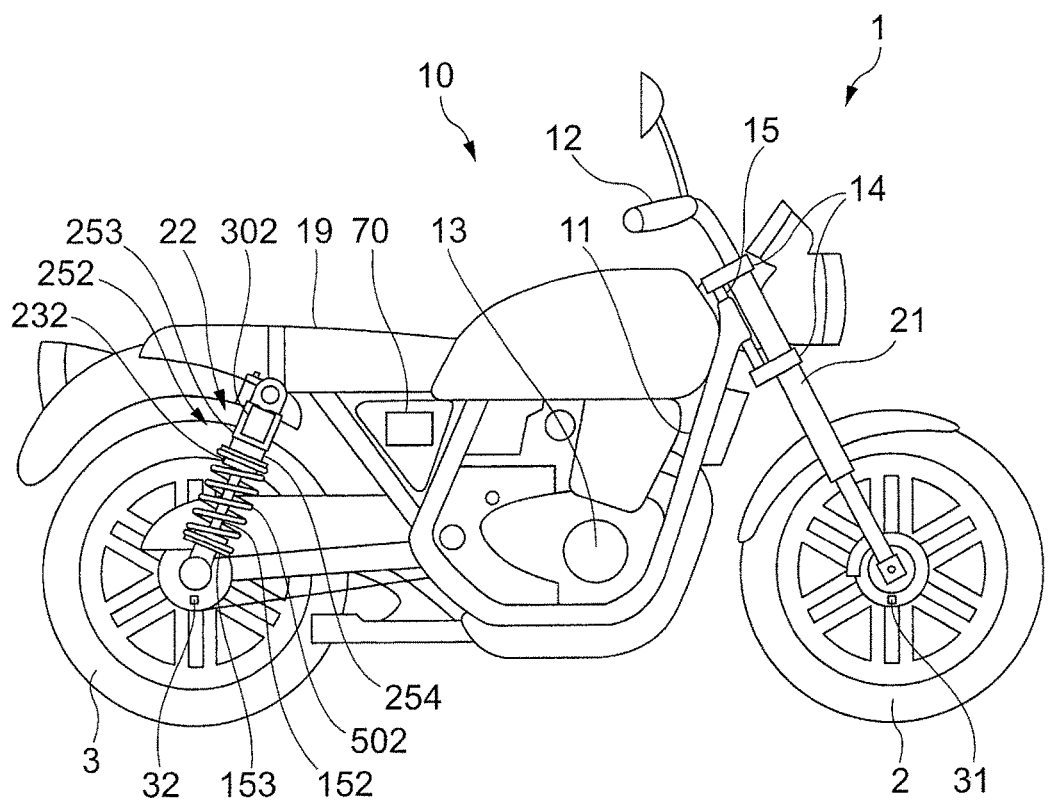
FIG. 1 illustrates a schematic configuration of a motorcycle according to an embodiment.

The embodiments will now be described with reference to the accompanying drawings, wherein like reference numerals designate corresponding or identical elements throughout the various drawings.

FIG. 1 illustrates a schematic configuration of a motorcycle 1 according to this embodiment.

The motorcycle 1 includes a front wheel 2, a rear wheel 3, and a body 10. The front wheel 2 is a wheel on the front side of the motorcycle 1. The rear wheel 3 is a wheel on the rear side of the motorcycle 1. The body 10 includes elements such as a frame 11, a handle 12, an engine 13, and a seat 19. The frame 11 defines the framework of the motorcycle 1.

The motorcycle 1 includes front forks 21, which are an example of a suspension device that couples the front wheel 2 and the body 10 to each other. The motorcycle 1 also includes rear suspensions 22 to couple the rear wheel 3 and the body 10 to each other. The front forks 21 and the rear suspensions 22 are an example of the changer to change the position of the body 10 relative to the axle of the front wheel 2 and the position of the body 10 relative to the axle of the rear wheel 3.

The motorcycle 1 includes two brackets 14 and a shaft 15. The shaft 15 is disposed between the two brackets 14. The two brackets 14 respectively hold the front fork 21 on the right side of the front wheel 2 and the front fork 21 on the left side of the front wheel 2. The shaft 15 is rotatably supported by the frame 11.

The motorcycle 1 includes a controller 70. The controller 70 controls the height of the motorcycle 1 by controlling a front-wheel passage switch unit 300, described later, of each front fork 21 and a rear-wheel passage switch unit 302, described later, of each rear suspension 22.

The motorcycle 1 also includes a front-wheel rotation detection sensor 31 and a rear-wheel rotation detection sensor 32. The front-wheel rotation detection sensor 31 detects the rotation angle of the front wheel 2. The rear-wheel rotation detection sensor 32 detects the rotation angle of the rear wheel 3.

Configuration of Front Fork 21

Each front fork 21 will be described in detail below.

Figure 2:
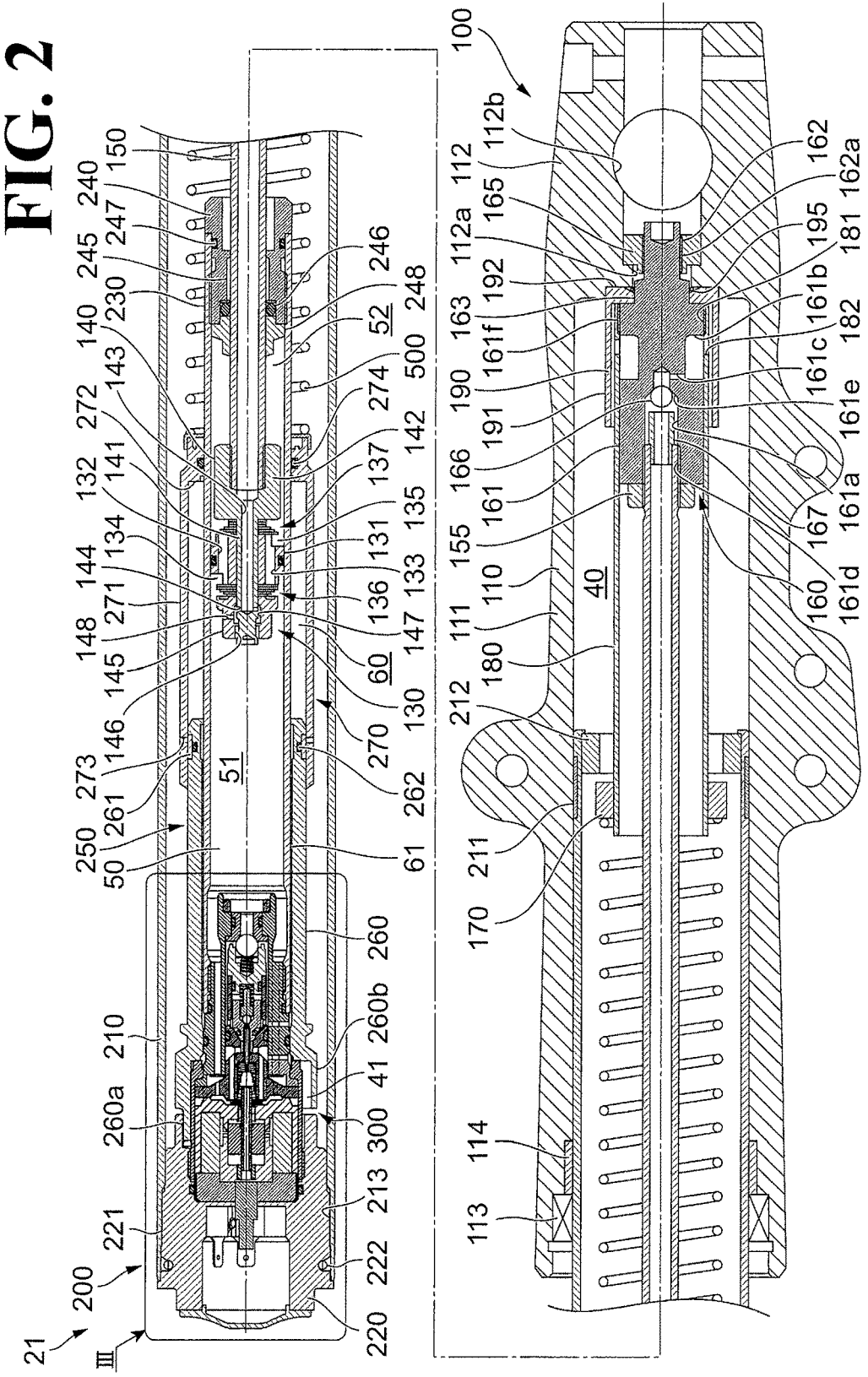
FIG. 2 is a cross-sectional view of a front fork according to the embodiment.

FIG. 2 is a cross-sectional view of the front fork 21 according to this embodiment.

The front fork 21 according to this embodiment is what is called an upright front fork that is disposed between the body 10 and the front wheel 2 of the motorcycle 1 so as to support the front wheel 2. The upright front fork 21 includes an outer member 110 (detailed later) and an inner tube 210 (detailed later). The outer member 110 is disposed on the side of the front wheel 2, and the inner tube 210 is disposed on the side of the body 10.

The front fork 21 includes an axle side unit 100 and a body side unit 200. The axle side unit 100 includes the outer member 110 and is mounted on the axle of the front wheel 2. The body side unit 200 includes the inner tube 210 and is mounted on the body 10. The front fork 21 also includes a front-wheel spring 500. The front-wheel spring 500 is disposed between the axle side unit 100 and the body side unit 200 to absorb vibrations transmitted to the front wheel 2 caused by the roughness of a ground surface.

The outer member 110 and the inner tube 210 are coaxial, hollow cylindrical members. A direction of the center line (that is, an axial direction) of each cylinder will be hereinafter occasionally referred to as "vertical direction". In this case, the body 10 side will occasionally be referred to the upper side, and the front wheel 2 side will occasionally be referred to as the lower side. By moving the axle side unit 100 and the body side unit 200 relative to each other in the vertical direction (axial direction), the front fork 21 absorbs vibrations caused by the roughness of the ground surface while supporting the front wheel 2.

Configuration of Axle Side Unit 100

The axle side unit 100 includes the outer member 110, an attenuation force generation unit 130, a rod 150, and a rod holding member 160. The outer member 110 is mounted on the axle of the front wheel 2. The attenuation force generation unit 130 generates attenuation force utilizing viscous resistance of oil. The rod 150 holds the attenuation force generation unit 130. The rod holding member 160 holds the lower-side end of the rod 150.

The axle side unit 100 also includes a ball 166 and a regulation member 167. The ball 166 has a spherical shape and is disposed in an axial depression 161a, described later, of the rod holding member 160. The regulation member 167 regulates the movement of the ball 166.

The axle side unit 100 also includes a spring support member 170, a support-member holding member 180, and a guide member 190. The spring support member 170 supports the lower-side end of the front-wheel spring 500. The support-member holding member 180 holds the spring support member 170. The guide member 190 guides the inner tube 210 to move in the axial direction.

Configuration of Outer Member 110

The outer member 110 includes a hollow cylindrical portion 111 and an axle bracket 112. The hollow cylindrical portion 111 has a hollow cylindrical shape for the inner tube 210 to be inserted into the hollow cylindrical shape. The axle bracket 112 is mountable to the axle of the front wheel 2.

The hollow cylindrical portion 111, at its upper end, includes an oil seal 113 and a slide bush 114. The oil seal 113 seals the gap between the outer surface of the inner tube 210 and the hollow cylindrical portion 111. The slide bush 114 smoothens the sliding contact between the hollow cylindrical portion 111 and the outer surface of the inner tube 210.

The axle bracket 112 has an axial through hole 112a and an axle mounting hole 112b. The axial through hole 112a is oriented in the axial direction for the rod holding member 160 to be inserted through the axial through hole 112a. The axle mounting hole 112b penetrates the axle bracket 112 in a direction crossing the axial direction to receive the axle of the front wheel 2.

Configuration of Attenuation Force Generation Unit 130

The attenuation force generation unit 130 includes a piston 131, an upper-end side valve 136, and a lower-end side valve 137. The piston 131 defines an operating oil chamber 50, which is formed in the space inside a cylinder 230, described later. The upper-end side valve 136 is disposed at the upper-side end of the piston 131. The lower-end side valve 137 is disposed at the lower-side end of the piston 131. The attenuation force generation unit 130 also includes a piston bolt 140 and a nut 145. The piston bolt 140 supports the piston 131, the upper-end side valve 136, the lower-end side valve 137, and other members. The nut 145 is screwed on the piston bolt 140 to determine the positions of the piston 131, the upper-end side valve 136, the lower-end side valve 137, and other members.

The piston 131 is a hollow cylindrical member and has on its outer surface a hermetic member sealing the gap between the cylinder 230 and the piston 131. The piston 131 also has a first through hole 132 and a second through hole 133, which are through holes open in the axial direction. The piston 131 includes first radial conduits 134 and second radial conduits 135. The first radial conduits 134 radially extend at the upper-side end of the piston 131 and communicate with the first through hole 132. The second radial conduits 135 radially extend at the lower-side end of the piston 131 and communicate with the second through hole 133. A non-limiting example of the number of each of the first through holes 132 and the second through holes 133 is three. The three first through holes 132 and the three second through holes 133 are each disposed at equal intervals in a circumferential direction and at positions respectively corresponding to the first through hole 132 and the second through hole 133.

The upper-end side valve 136 is made up of a stack of approximately disk-shaped metal plates. A through hole penetrates the center of the stack of metal plates. A shaft 141, described later, of the piston bolt 140 is inserted through the through hole. The upper-end side valve 136 blocks the second through hole 133 and opens the first through hole 132.

The lower-end side valve 137 is made up of a stack of approximately disk-shaped metal plates. A through hole penetrates the center of the stack of metal plates. The shaft 141, described later, of the piston bolt 140 is inserted through the through hole. The lower-end side valve 137 blocks the first through hole 132 and opens the second through hole 133.

The piston bolt 140 includes the shaft 141 and a base 142. The shaft 141 is disposed on the upper end side of the piston bolt 140 and has a solid cylindrical shape. The base 142 is disposed on the lower end side of the piston bolt 140 and has a solid cylindrical shape of larger radius than the radius of the shaft 141. In the piston bolt 140, a depression 143 is formed over the depth from the lower-side end surface of the base 142 to the shaft 141.

The shaft 141 has a male thread formed at the upper-side end of the shaft 141. The male thread is screwed on a female thread formed on the nut 145.

The depression 143 has a female thread formed on the inner surface at the lower-side end of the depression 143. The female thread receives a male thread formed on the upper-side end of the rod 150. At the upper-side end of the depression 143, a radial through hole 144 is formed. The radial through hole 144 radially penetrates the depression 143 to allow the depression 143 to communicate with the outside of the shaft 141.

On the upper-side end of the nut 145, a female thread 146 is formed. The female thread 146 receives a male thread of the piston bolt 140. Under the female thread 146, a depression 147 is formed. The depression 147 is depressed over a depth from the lower-side end surface of the nut 145, and has a solid cylindrical shape of larger radius than the radius of the root of the female thread 146. In the nut 145, a radial through hole 148 is formed. The radial through hole 148 radially penetrates the nut 145 to allow the outside of the nut 145 to communicate with the depression 147.

With the configuration described hereinbefore, the attenuation force generation unit 130 is held on the rod 150 with the male thread on the upper-side end of the rod 150 screwed on the female thread on the depression 143 of the piston bolt 140. The piston 131 is in contact with the inner surface of the cylinder 230 through the hermetic member on the outer surface of the piston 131. Thus, the piston 131 defines a first oil chamber 51 and a second oil chamber 52 in the space inside the cylinder 230. The first oil chamber 51 is upper than the piston 131, and the second oil chamber 52 is lower than the piston 131.

Configuration of Rod 150

The rod 150 is a hollow cylindrical member, and has male threads at the upper-side end and the lower-side end on the outer surface of the rod 150. The male thread on the upper-side end of the rod 150 is screwed on the piston bolt 140 of the attenuation force generation unit 130. The male thread on the lower-side end of the rod 150 is screwed on a female thread 161d. The female thread 161d is formed on an upper-end-side solid cylindrical portion 161. The upper-end-side solid cylindrical portion 161 is disposed on the upper end side of the rod holding member 160. A lock nut 155 is screwed on the male thread on the lower-side end of the rod 150. Thus, the rod 150 is secured on the rod holding member 160.

The rod 150 also has a female thread formed on the inner surface of the rod 150 at the lower-side end of the rod 150.

Configuration of Rod Holding Member 160

The rod holding member 160 has a plurality of solid cylindrical portions of different diameters. Namely, the rod holding member 160 includes the upper-end-side solid cylindrical portion 161, a lower-end-side solid cylindrical portion 162, and an intermediate solid cylindrical portion 163. The upper-end-side solid cylindrical portion 161 is disposed at the upper-side end of the rod holding member 160. The lower-end-side solid cylindrical portion 162 is disposed at the lower-side end of the rod holding member 160. The intermediate solid cylindrical portion 163 is disposed between the upper-end-side solid cylindrical portion 161 and the lower-end-side solid cylindrical portion 162.

The upper-end-side solid cylindrical portion 161 has the axial depression 161a, a radial depression 161b, and a radial through hole 161c. The axial depression 161a is depressed over a depth in the axial direction from the upper-side end surface of the upper-end-side solid cylindrical portion 161. The radial depression 161b is depressed radially throughout the circumference of the upper-end-side solid cylindrical portion 161 over a depth from the outer surface of the upper-end-side solid cylindrical portion 161. The radial through hole 161c penetrates the axial depression 161a and the radial depression 161b in a radial direction.

The axial depression 161a has the female thread 161d, which receives the male thread on the lower-side end of the rod 150. The axial depression 161a also has an inclined surface 161e. The inclined surface 161e is inclined relative to the axial direction, that is, the inner diameter of the inclined surface 161e gradually decreases in the lower side direction.

On the lower-side end of the upper-end-side solid cylindrical portion 161, a male thread 161f is formed. The male thread 161f is screwed on a female thread 181, which is described later and formed on the support-member holding member 180.

The intermediate solid cylindrical portion 163 has a diameter smaller than the inner diameter of the axial through hole 112a of the outer member 110. Thus, the intermediate solid cylindrical portion 163 is fitted in the axial through hole 112a of the outer member 110.

On the outer surface of the lower-end-side solid cylindrical portion 162, a male thread 162a is formed.

The rod holding member 160 is secured on the outer member 110 with the male thread 162a, which is on the lower-end-side solid cylindrical portion 162, screwed on a nut 165. The nut 165 is inserted through the axial through hole 112a of the outer member 110.

Configuration of Regulation Member 167

The regulation member 167 is a stepped, hollow cylindrical member. The regulation member 167 has a male thread formed on the outer surface at the upper-side end of the regulation member 167. The regulation member 167 is secured on the rod 150 with the male thread screwed on the female thread on the inner surface at the lower-side end of the rod 150. The regulation member 167, at its lower-side end, regulates the movement of the ball 166, which is disposed in the axial depression 161a of the rod holding member 160.

Configuration of Spring Support Member 170

The spring support member 170 is a hollow cylindrical member, and is secured on the upper-side end of the support-member holding member 180. Examples of the method of securing the spring support member 170 include, but are not limited to, welding and press fitting.

Configuration of Support-Member Holding Member 180

The support-member holding member 180 is a hollow cylindrical member. At the lower-side end of the support-member holding member 180, the female thread 181 is formed. The female thread 181 receives the male thread 161f, which is formed on the rod holding member 160. The support-member holding member 180 is secured on the rod holding member 160 with the female thread 181 receiving the male thread 161f, which is formed on the rod holding member 160. The support-member holding member 180 has a communication hole 182. The communication hole 182 is formed at a position axially corresponding to the radial depression 161b of the rod holding member 160, and thus communicates the inside and outside of the support-member holding member 180 with each other.

Configuration of Guide Member 190

The guide member 190 includes a hollow cylindrical portion 191 and an internally facing portion 192. The hollow cylindrical portion 191 has a hollow cylindrical shape. The internally facing portion 192 radially internally extends from the lower-side end of the hollow cylindrical portion 191.

The guide member 190 is secured between the rod holding member 160 and the outer member 110 with the internally facing portion 192 held between the rod holding member 160 and the outer member 110.

The internally facing portion 192 is chamfered at the lower-side end of the internally facing portion 192. An O ring 195 is fitted in the space defined between the chamfered portion and the rod holding member 160. The O ring 195 seals the gap between the guide member 190, the rod holding member 160, and the outer member 110. Thus, the O ring 195 keeps the space inside the hollow cylindrical portion 111 of the outer member 110 liquid tight.

In the axle side unit 100 with the configuration described hereinbefore, a reservoir chamber 40 is defined between the inner surface of the outer member 110 and the outer surfaces of the rod 150 and the support-member holding member 180. The reservoir chamber 40 is an example of the storage chamber to store oil kept hermetic in the front fork 21.

Configuration of Body Side Unit 200

The body side unit 200 includes the inner tube 210 and a cap 220. The inner tube 210 has a hollow cylindrical shape with open ends. The cap 220 is mounted on the upper-side end of the inner tube 210.

The body side unit 200 also includes the cylinder 230 and a hermetic member 240. The cylinder 230 has a hollow cylindrical shape. The hermetic member 240 is mounted on the lower-side end of the cylinder 230, and keeps the space inside the cylinder 230 hermetic.

The body side unit 200 also includes a front-wheel spring length adjustment unit 250 and the front-wheel passage switch unit 300. The front-wheel spring length adjustment unit 250 is a non-limiting example of the adjustor that supports the front-wheel spring 500 at its upper-side end and adjusts (changes) the length of the front-wheel spring 500. The front-wheel passage switch unit 300 is mounted on the upper-side end of the cylinder 230 and selects a passage for oil, which is a non-limiting example of the fluid.

Figure 12:
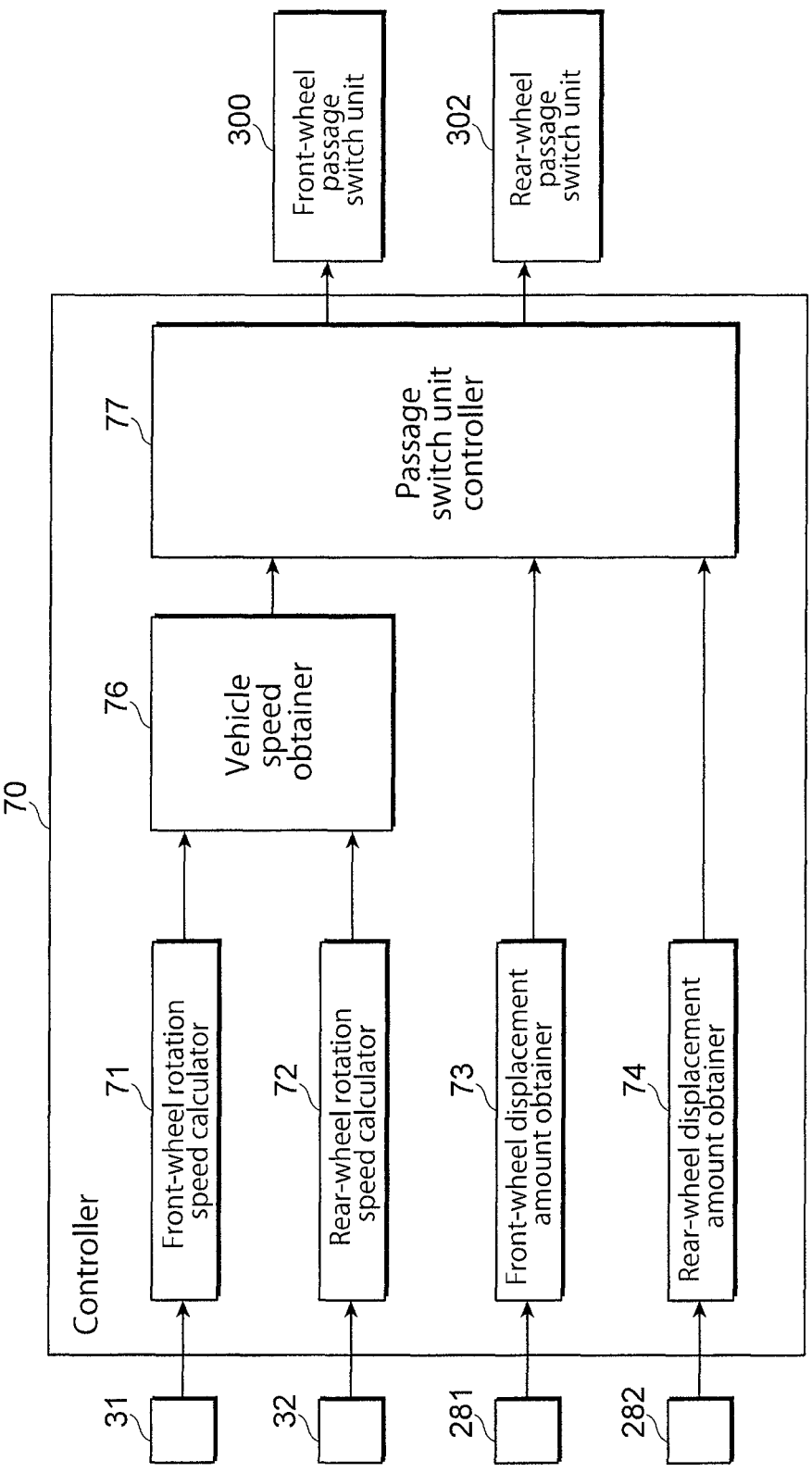
FIG. 12 is a block diagram of a controller.

The body side unit 200 also includes a front-wheel relative position detector 281 (see FIG. 12). The front-wheel relative position detector 281 is an example of the detector to detect the position of an upper-side end support member 270 relative to a base member 260, described later, of the front-wheel spring length adjustment unit 250.

Configuration of Inner Tube 210

The inner tube 210 is a hollow cylindrical member.

The inner tube 210, at its lower-side end, includes a slide bush 211 and a movement regulation member 212. The slide bush 211 has a hollow cylindrical shape and smoothens the sliding contact between the inner tube 210 and the inner surface of the hollow cylindrical portion 111 of the outer member 110. The movement regulation member 212 has a hollow cylindrical shape and is in contact with the spring support member 170 and the axle bracket 112 of the outer member 110. Thus, the movement regulation member 212 regulates axial movement of the inner tube 210.

On the upper-side end of the inner tube 210, a female thread 213 is formed. The female thread 213 receives a male thread formed on the cap 220, described later.

Configuration of Cap 220

The cap 220 is an approximately hollow cylindrical member. On the outer surface of the cap 220, a male thread 221 is formed. The male thread 221 is screwed on the female thread 213, which is formed on the inner tube 210. On the inner surface of the cap 220, a female thread is formed that receives male threads on the front-wheel spring length adjustment unit 250 and the front-wheel passage switch unit 300. The cap 220 is mounted on the inner tube 210 and holds the front-wheel spring length adjustment unit 250 and the front-wheel passage switch unit 300.

The cap 220 includes an O ring 222. The O ring 222 keeps the space inside the inner tube 210 liquid tight.

Configuration of Cylinder 230

The cylinder 230 is a hollow cylindrical member. On the outer surface at the upper-side end of the cylinder 230, a female thread is formed that receives the male thread on the front-wheel passage switch unit 300. On the inner surface at the lower-side end of the cylinder 230, a female thread is formed that receives a male thread on the hermetic member 240.

Configuration of Hermetic Member 240

The hermetic member 240 is a hollow cylindrical member. On the outer surface of the hermetic member 240, a male thread is formed that is screwed on the female thread on the inner surface at the lower-side end of the cylinder 230. The hermetic member 240 is held on the cylinder 230 with the male thread screwed on the female thread on the inner surface at the lower-side end of the cylinder 230.

The hermetic member 240 includes a slide bush 245 on the inner circumference side of the hermetic member 240. The slide bush 245 smoothens the sliding contact between the hermetic member 240 and the outer surface of the rod 150. In order to keep the space inside the cylinder 230 liquid tight, the hermetic member 240 includes an O ring 246 and an O ring 247. The O ring 246 is disposed between the hermetic member 240 and the outer surface of the rod 150.

The O ring 247 is disposed between the hermetic member 240 and the inner surface of the cylinder 230.

The hermetic member 240 also includes an impact alleviation member 248 at the upper-side end of the hermetic member 240. The impact alleviation member 248 alleviates the impact of contact between the hermetic member 240 and the attenuation force generation unit 130. A non-limiting example of the impact alleviation member 248 is an elastic member such as resin and rubber.

Configuration of Front-Wheel Spring Length Adjustment Unit 250

The front-wheel spring length adjustment unit 250 includes the base member 260 and the upper-side end support member 270. The base member 260 is secured on the cap 220. The upper-side end support member 270 supports the front-wheel spring 500 at its upper-side end, and is movable in the axial direction relative to the base member 260. Thus, the upper-side end support member 270 adjusts the length of the front-wheel spring 500.

The base member 260 is an approximately hollow cylindrical member. On the outer surface at the upper-side end of the base member 260, a male thread 260a is formed. The male thread 260a is screwed on the female thread on the cap 220. The base member 260 is secured on the cap 220 with the male thread 260a screwed on the female thread on the cap 220.

The base member 260 has a protrusion 260b at the upper-side end of the base member 260. The protrusion 260b is a radially protruding part of the circumference of the base member 260. A discharge passage 41 is disposed between the protrusion 260b and the lower-side end on the outer surface of a support member 400, described later. The discharge passage 41 is for the oil in the cylinder 230 to be discharged into the reserver chamber 40.

The base member 260, at its lower-side end, includes a slide bush 261 and an O ring 262. The slide bush 261 has a hollow cylindrical shape fitted in the outer circumference of the base member 260, and smoothens the sliding contact between the base member 260 and the inner surface of the upper-side end support member 270. The O ring 262 is radially inner than the slide bush 261. A ring-shaped passage 61 is defined between the inner surface of the base member 260 and the outer surface of the cylinder 230. The ring-shaped passage 61 has a ring shape.

The upper-side end support member 270 includes a hollow cylindrical portion 271 and an internally facing portion 272. The hollow cylindrical portion 271 has a hollow cylindrical shape. The internally facing portion 272 radially internally extends from the lower-side end of the hollow cylindrical portion 271. The upper-side end support member 270 defines a jack chamber 60 in the space defined between the outer surface of the cylinder 230 and the lower-side end of the base member 260. The jack chamber 60 stores oil for use in adjusting the position of the upper-side end support member 270 relative to the base member 260.

The hollow cylindrical portion 271 has an inner diameter equal to or smaller than the outer diameter of the slide bush 261, which is fitted in the base member 260. The hollow cylindrical portion 271 has a radial through hole 273. The radial through hole 273 radially penetrates the hollow cylindrical portion 271 and thus communicates the inside and outside of the hollow cylindrical portion 271 with each other. Through the radial through hole 273, the oil in the jack chamber 60 is discharged into the reservoir chamber 40. In this manner, the displacement of the upper-side end support member 270 relative to the base member 260 is regulated.

The internally facing portion 272 includes an O ring 274 on the inner circumference side of the internally facing portion 272. The O ring 274 seals the gap between the internally facing portion 272 and the outer surface of the cylinder 230, and thus keeps the jack chamber 60 liquid tight.

The jack chamber 60 is supplied the oil in the cylinder 230 through the ring-shaped passage 61, which is defined between the inner surface of the base member 260 and the outer surface of the cylinder 230. This configuration will be detailed later.

Configuration of Front-Wheel Relative Position Detector 281

The front-wheel relative position detector 281 detects, for example, the amount of displacement of the upper-side end support member 270 in the vertical direction relative to the base member 260, that is, the amount of displacement of the upper-side end support member 270 in the vertical direction relative to the body frame 11. In a non-limiting embodiment, a coil is wound around the outer surface of the base member 260, and the upper-side end support member 270 is made of magnetic material. Based on the impedance of the coil, which changes in accordance with displacement of the upper-side end support member 270 in the vertical direction relative to the base member 260, the front-wheel relative position detector 281 detects the amount of displacement of the upper-side end support member 270.

Configuration of Front-Wheel Passage Switch Unit 300

Figure 3:
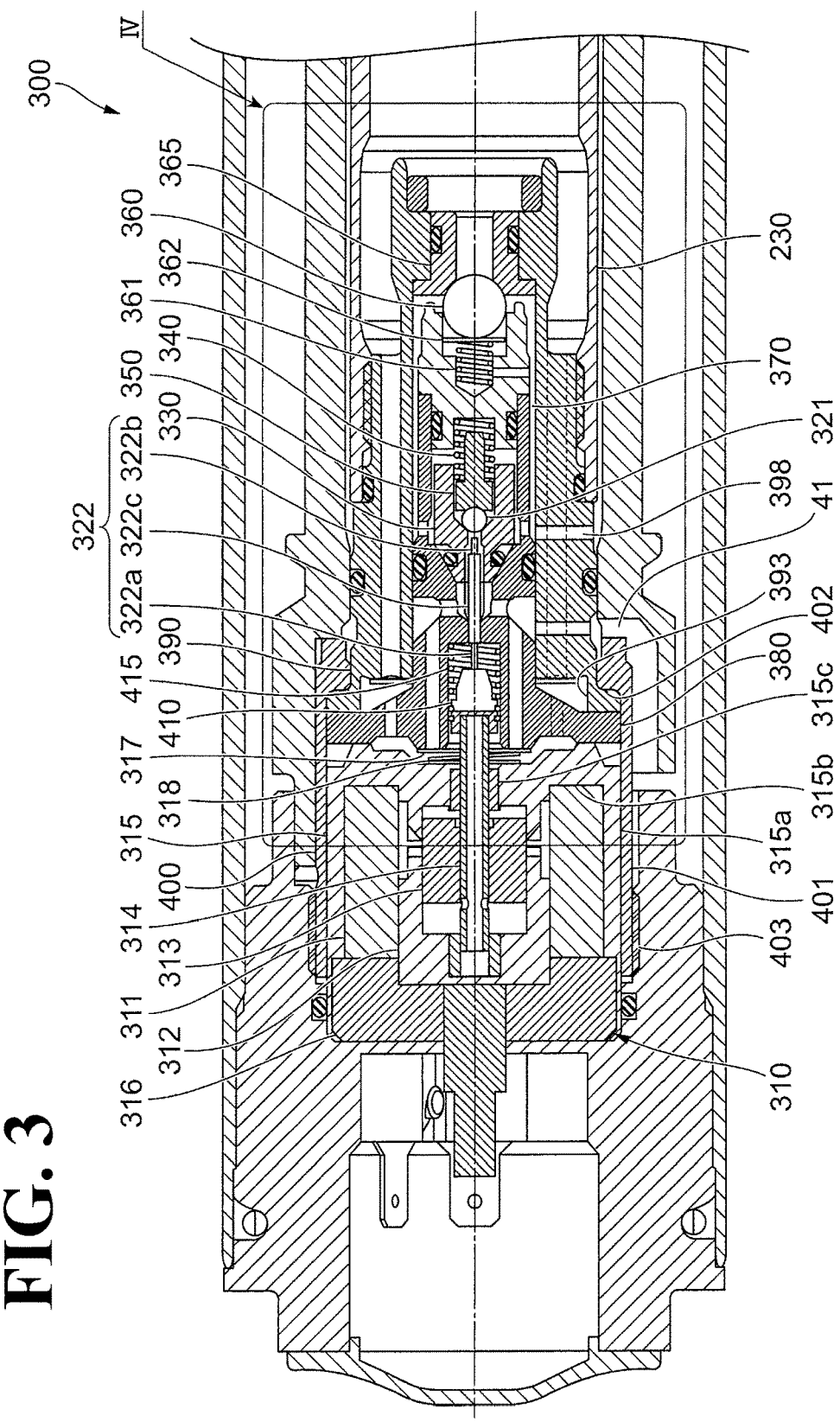
FIG. 3 is an enlarged view of part III illustrated in FIG. 2.

FIG. 3 is an enlarged view of part III illustrated in FIG. 2.

Figure 4:
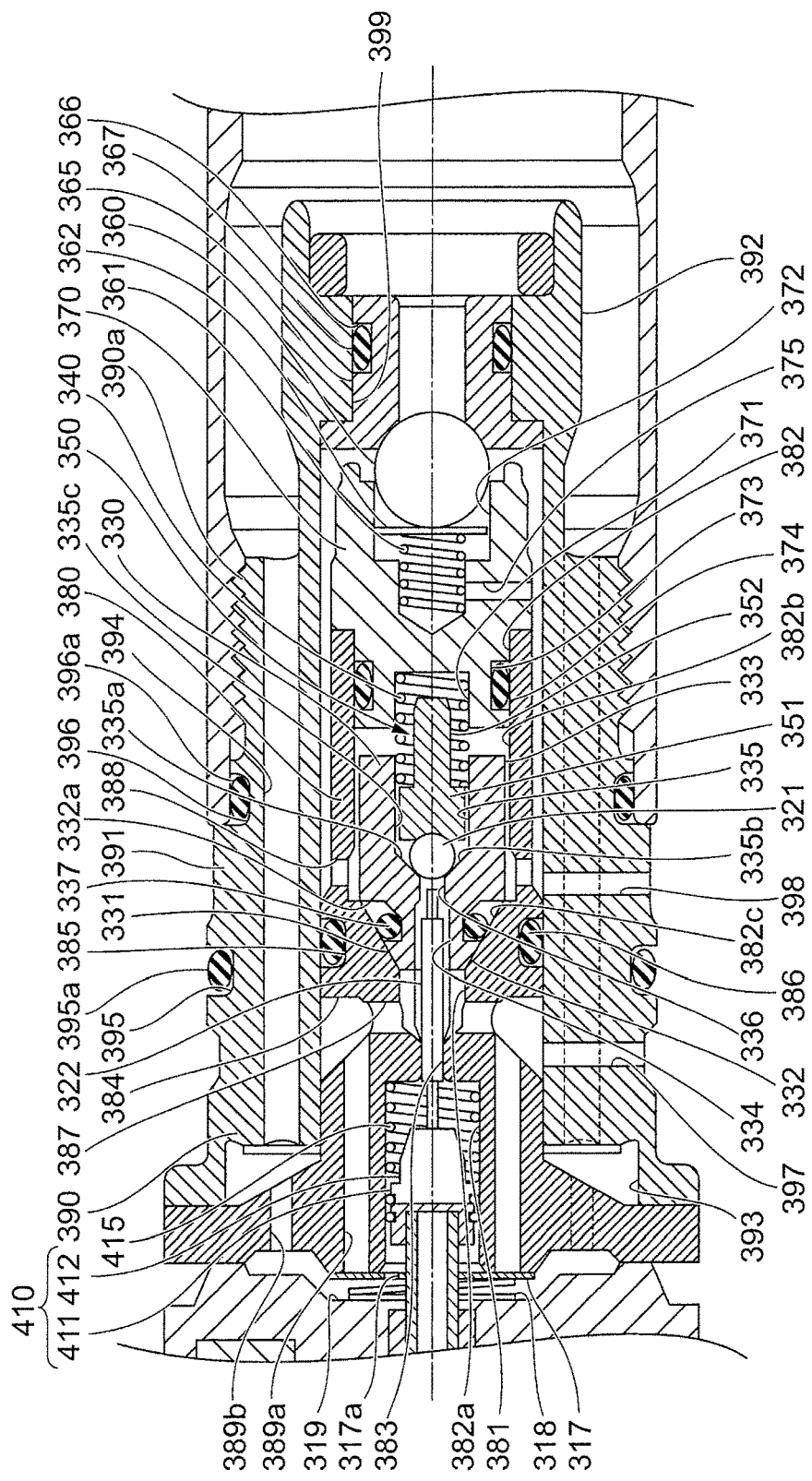
FIG. 4 is an enlarged view of part IV illustrated in FIG. 3.

FIG. 4 is an enlarged view of part IV illustrated in FIG. 3.

The front-wheel passage switch unit 300 is a device that switches among a first option, a second option, and a third option. In the first option, the front-wheel passage switch unit 300 supplies oil discharged from a pump 600, described later, to the reservoir chamber 40. In the second option, the front-wheel passage switch unit 300 supplies the oil discharged from the pump 600 to the jack chamber 60. In the third option, the front wheel passage switch unit 300 supplies the oil accommodated in the jack chamber 60 to the reservoir chamber 40.

The front-wheel passage switch unit 300 includes a front-wheel solenoid 310, a spherical valve body 321, a push rod 322, a valve-body seat member 330, a coil spring 340, and a press member 350. The push rod 322 presses the valve body 321. The valve-body seat member 330 has a resting surface for the valve body 321. The press member 350 receives the spring force of the coil spring 340 to press the valve body 321 against the resting surface.

The front-wheel passage switch unit 300 also includes a ball 360, a coil spring 361, and a disc 362. The coil spring 361 applies axial urging force to the ball 360. The disc 362 is disposed between the ball 360 and the coil spring 361. The front-wheel passage switch unit 300 also includes a ball seat member 365 and an accommodation member 370. The ball seat member 365 has a resting surface for the ball 360. The accommodation member 370 accommodates the coil spring 361 and the disc 362.

The front-wheel passage switch unit 300 also includes a valve accommodation inner member 380, a valve accommodation outer member 390, and the support member 400. The valve accommodation inner member 380 accommodates the valve body 321, the valve-body seat member 330, and other members. The valve accommodation outer member 390 is disposed outside the valve accommodation inner member 380, and accommodates the ball 360, the ball seat member 365, and other members. The support member 400 supports the valve accommodation inner member 380 and the valve accommodation outer member 390.

The front-wheel passage switch unit 300 also includes a transmission member 410 and a coil spring 415. The transmission member 410 is mounted on the lower end of an operation rod 314, described later, of the front-wheel solenoid 310, and transmits thrust of the front-wheel solenoid 310 to the push rod 322. The coil spring 415 applies axial urging force to the transmission member 410.

Configuration of Front-Wheel Solenoid 310

The front-wheel solenoid 310 is a proportional solenoid that includes a coil 311, a core 312, a plunger 313, and an operation rod 314. The core 312 is disposed inside the coil 311. The plunger 313 is guided by the core 312. The operation rod 314 is coupled to the plunger 313.

The front-wheel solenoid 310 also includes a case 315 and a cover 316. The case 315 accommodates the coil 311, the core 312, the plunger 313, and other members. The cover 316 covers an opening of the case 315.

The case 315 includes a hollow cylindrical portion 315$a$ and an internally facing portion 315$b$. The hollow cylindrical portion 315$a$ has a hollow cylindrical shape. The internally facing portion 315$b$ radially internally extends from the lower-side end of the hollow cylindrical portion 315$a$. The internally facing portion 315$b$ has a through hole through which the operation rod 314 is inserted. A guide bush 315$c$ is fitted with the internally facing portion 315$b$ to guide the movement of the operation rod 314.

The operation rod 314 has a hollow cylindrical shape. At the upper-side end, the operation rod 314 is accommodated in the case 315. At the lower-side end, the operation rod 314 protrudes from the case 315. The portion of the operation rod 314 protruding from the case 315 is attached with a disc-shaped valve 317. The disc-shaped valve 317 opens and closes a passage, described later, formed in the valve accommodation inner member 380. A coil spring 318 surrounds the portion of the operation rod 314 between the valve 317 and the case 315. The coil spring 318 applies an axial urging force to the valve 317.

With the configuration of the front-wheel solenoid 310 described hereinbefore, the coil 311 is supplied a current through a connector and a lead that are mounted on the cap 220. The current causes the plunger 313 to generate an axial thrust that accords with the amount of the current. The thrust of the plunger 313 causes the operation rod 314, which is coupled to the plunger 313, to make an axial movement. In the front-wheel solenoid 310 according to this embodiment, the plunger 313 generates an amount of axial thrust that causes the operation rod 314 to protrude from the case 315 by an amount that increases as the current supplied to the coil 311 increases.

The amount of the current supplied to the coil 311 is controlled by the controller 70.

Configuration of Push Rod 322

As illustrated in FIG. 3, the push rod 322 includes a first shaft 322$a$, a second shaft 322$b$, and a third shaft 322$c$. The first shaft 322$a$ has a cylindrical shape and is disposed on the upper end side of the push rod 322. The second shaft 322$b$ has a cylindrical shape and is disposed on the lower end side of the push rod 322. The third shaft 322$c$ has a cylindrical shape and is disposed between the first shaft 322$a$ and the second shaft 322$b$.

The third shaft 322$c$ has a radius larger than each radius of the first shaft 322$a$ and the second shaft 322$b$. In other words, a cross-sectional area of the third shaft 322$c$ perpendicular to the axial direction is larger than a cross-sectional area of each of the first shaft 322$a$ and the second shaft 322$b$ perpendicular to the axial direction.

The valve body 321 and the push rod 322 may be integral to each other.

Configuration of Valve-Body Seat Member 330

The valve-body seat member 330 includes a conical portion 332 and a solid cylindrical portion 333. The conical portion 332 has an inclined surface 331. The inclined surface 331 is inclined relative to the axial direction, that is, the outer diameter of the valve-body seat member 330 gradually increases in the lower side direction. The solid cylindrical portion 333 has a solid cylindrical shape.

The conical portion 332 has an upper-end depression 334. The upper-end depression 334 is depressed over a depth in the axial direction from the upper-side end surface of the conical portion 332. The solid cylindrical portion 333 has a lower-end depression 335 and a communication hole 336. The lower-end depression 335 is depressed over a depth in the axial direction from the lower-side end surface of the solid cylindrical portion 333. Through the communication hole 336, the lower-end depression 335 and the upper-end depression 334 communicate with each other.

The upper-end depression 334 has an inner diameter larger than the radius of the third shaft 322$c$. The communication hole 336 has an inner diameter larger than the radius of the second shaft 322$b$. The second shaft 322$b$ and the third shaft 322$c$ in the push rod 322 are inserted in the communication hole 336 and the upper-end depression 334. The gap between the outer surface of the second shaft 322$b$ and the inner surface of the communication hole 336, and the gap between the outer surface of the third shaft 322$c$ and the inner surface of the upper-end depression 334 function as part of a third communicating passage R3, described later, and part of a fourth communicating passage R4, described later.

The lower-end depression 335 includes a conical depression 335$b$ and a cylindrical depression 335$c$. The conical depression 335$b$ has an inclined surface 335$a$. The inclined surface 335$a$ is inclined relative to the axial direction, that is, the radius of the conical depression 335$b$ gradually increases in the lower side direction. The cylindrical depression 335$c$ has a cylindrical shape. The radius of the conical depression 335$b$ increases in the lower side direction from a value smaller than the radius of the valve body 321 to a value larger than the radius of the valve body 321. The conical depression 335$b$ accommodates the valve body 321. With the valve body 321 in contact with the inclined surface 335$a$, the gap between the valve body 321 and the conical depression 335$b$ is sealed. The radius of the cylindrical depression 335$c$ of the lower-end depression 335 is larger than the radius of a first solid cylindrical portion 351, described later, of the press member 350. The lower-end depression 335 accommodates the first solid cylindrical portion 351 of the press member 350.

The conical portion 332 has a groove 332$a$ on the outer surface of the conical portion 332. The groove 332$a$ is depressed radially throughout the circumference of the conical portion 332. An O ring 337 is fitted in the groove 332$a$ to seal the gap between the conical portion 332 and the valve accommodation inner member 380.

Configuration of Press Member 350

The press member 350 includes two solid cylindrical portions of different diameters, namely, the first solid cylindrical portion 351 and the second solid cylindrical portion 352.

The first solid cylindrical portion 351 has a depression formed on the upper-side end surface of the first solid cylindrical portion 351. This depression fits the shape of the lower-side end of the valve body 321. The radius of the first solid cylindrical portion 351 is larger than the radius of the valve body 321 and larger than half the center diameter of the coil spring 340. On the upper-side end surface, the first solid cylindrical portion 351 supports the lower-side end of the valve body 321. On the lower-side end surface, the first solid cylindrical portion 351 supports the upper-side end of the coil spring 340.

The radius of the second solid cylindrical portion 352 is smaller than half the inner diameter of the coil spring 340. The second solid cylindrical portion 352 is inside the coil spring 340. The second solid cylindrical portion 352 is fitted in an axial through hole 376, described later, formed in the accommodation member 370. The diameter of the second solid cylindrical portion 352 is set to be approximately equal to or slightly smaller than the diameter of the axial through hole 376 formed in the accommodation member 370. Thus, the press member 350 is supported movably in the axial direction by the accommodation member 370.

Configuration of Ball Seat Member 365

The ball seat member 365 is a hollow cylindrical member with a flange formed at the upper-side end of the ball seat member 365. The ball seat member 365 has an opening at the upper-side end of the ball seat member 365. In the opening, a depression is formed that fits the shape of the lower-side end of the ball 360. The ball seat member 365 has a groove 366 formed on the outer surface of the ball seat member 365. The groove 366 is depressed radially throughout the circumference of the ball seat member 365. An O ring 367 is fitted in the groove 366 to seal the gap between the groove 366 and the valve accommodation outer member 390.

The accommodation member 370 is an approximately solid cylindrical member. The accommodation member 370 has an upper-end depression 371 and a lower-end depression 372. The upper-end depression 371 has a cylindrical shape and is depressed over a depth in the axial direction from the upper-side end surface of the accommodation member 370. The lower-end depression 372 has a cylindrical shape and is depressed over a depth in the axial direction from the lower-side end surface of the accommodation member 370. The upper-end depression 371 accommodates the lower-side end of the coil spring 340. The lower-end depression 372 accommodates the coil spring 361 and the disc 362. The opening of the lower-end depression 372 is larger in size than the upper-side end of the ball 360. The lower-end depression 372 accommodates the upper-side end of the ball 360.

The accommodation member 370 is fitted in the lower-side end of the valve accommodation inner member 380. On the outer surface of the accommodation member 370, a groove 373 is formed. The groove 373 is depressed radially throughout the circumference of the accommodation member 370. An O ring 374 is fitted in the groove 373 to seal the gap between the accommodation member 370 and the valve accommodation inner member 380.

A radial through hole 375 is formed in a portion of the accommodation member 370 exposed from the valve accommodation inner member 380. The radial through hole 375 radially penetrates the accommodation member 370 to allow the inside of the lower-end depression 372 to communicate with the outside of the accommodation member 370.

The axial through hole 376 is formed in the accommodation member 370 in the axial direction to communicate the upper-end depression 371 and the lower-end depression 372 with each other. The second solid cylindrical portion 352 of the press member 350 is fitted in the axial through hole 376. Thus, the accommodation member 370 functions as the support member that is located in the opening of the valve accommodation inner member 380 and that movably supports the second solid cylindrical portion 352 of the press member 350.

Configuration of Valve Accommodation Inner Member 380

The valve accommodation inner member 380 is an approximately solid cylindrical member with a flange formed at the upper-side end of the valve accommodation inner member 380. The valve accommodation inner member 380 has an upper-end depression 381, a lower-end depression 382, and a communication hole 383. The upper-end depression 381 is depressed over a depth in the axial direction from the upper-side end surface of the valve accommodation inner member 380. The lower-end depression 382 is depressed over a depth in the axial direction from the lower-side end surface of the valve accommodation inner member 380. Through the communication hole 383, the upper-end depression 381 and the lower-end depression 382 communicate with each other.

On the outer surface of the valve accommodation inner member 380, a first radial depression 384 and a second radial depression 385 are formed. The first radial depression 384 and the second radial depression 385 are depressed radially throughout the circumference of the valve accommodation inner member 380.

The upper-end depression 381 has a solid cylindrical shape that accommodates the transmission member 410 and the coil spring 415.

The lower-end depression 382 includes a first cylindrical depression 382a, a second cylindrical depression 382b, and a conical depression 382c. The first cylindrical depression 382a and the second cylindrical depression 382b have cylindrical shapes of different diameters. The conical depression 382c is formed between the first cylindrical depression 382a and the second cylindrical depression 382b, and has an inclined surface inclined relative to the axial direction, that is, the radius of the conical depression 382c gradually increases in the lower side direction.

The first cylindrical depression 382a, the second cylindrical depression 382b, and the second cylindrical depression 382b accommodate the valve-body seat member 330. Specifically, the inclined surface of the conical depression 382c fits the shape of the inclined surface 331 of the conical portion 332 of the valve-body seat member 330. The second cylindrical depression 382b has a radius smaller than the radius of the solid cylindrical portion 333 of the valve-body seat member 330.

The upper-side end of the accommodation member 370 is fitted in the opening of the lower-end depression 382, that is, the lower-side end of the second cylindrical depression 382b. The O ring 374, which is fitted in the accommodation member 370, seals the gap between the accommodation member 370 and the valve accommodation inner member 380.

An O ring 386 is fitted in the second radial depression 385 to seal the gap between the second radial depression 385 and the valve accommodation outer member 390.

The valve accommodation inner member 380 has a plurality of first radial communication holes 387, which are formed at equal intervals in the circumferential direction. Each first radial communication hole 387 is a radial through hole through which the first cylindrical depression 382a of the lower-end depression 382 and the first radial depression 384 communicate with each other.

The valve accommodation inner member 380 has a plurality of second radial communication holes 388, which are formed at equal intervals in the circumferential direction. Each second radial communication hole 388 is a radial through hole through which the second cylindrical depression 382b and the outside of the valve accommodation inner member 380 communicate with each other.

The valve accommodation inner member 380 has a plurality of inner axial communication holes 389a formed at equal intervals in the circumferential direction. Each inner axial communication hole 389a is an axial through hole through which the upper-side end of the valve accommodation inner member 380 and the first radial depression 384 communicate with each other.

The valve accommodation inner member 380 has a plurality of outer axial communication holes 389b formed at equal intervals in the circumferential direction. The outer axial communication holes 389b axially penetrate the flange.

Configuration of Valve Accommodation Outer Member 390

The valve accommodation outer member 390 includes a first hollow cylindrical portion 391, a second hollow cylindrical portion 392, and a flange. The first hollow cylindrical portion 391 and the second hollow cylindrical portion 392 have cylindrical shapes of different diameters. The flange extends radially outwardly from the upper-side end of the first hollow cylindrical portion 391. The first hollow cylindrical portion 391 has an outer diameter larger than the outer diameter of the second hollow cylindrical portion 392.

The valve accommodation outer member 390 has an upper-end depression 393. The upper-end depression 393 is depressed over a depth in the axial direction from the upper-side end surface of the valve accommodation outer member 390.

The first hollow cylindrical portion 391 has a plurality of axial communication holes 394, which are formed at equal intervals in the circumferential direction. Each axial communication hole 394 allows the upper-end depression 393 to communicate with the space that is below the first hollow cylindrical portion 391 and defined between the outer surface of the second hollow cylindrical portion 392 and the inner surface of the cylinder 230.

The first hollow cylindrical portion 391 has, on its outer surface, a first radial depression 395, a second radial depression 396, and a male thread 390a. The first radial depression 395 and the second radial depression 396 are depressed radially throughout the circumference of the first hollow cylindrical portion 391. The male thread 390a is screwed on the female thread at the upper-side end of the cylinder 230.

An O ring 395a is fitted in the first radial depression 395 to seal the gap between the first radial depression 395 and the base member 260 of the front-wheel spring length adjustment unit 250.

An O ring 396a is fitted in the second radial depression 396 to seal the gap between the second radial depression 396 and the cylinder 230.

The first hollow cylindrical portion 391 has a plurality of first radial communication holes 397 and a plurality of second radial communication holes 398. The first radial communication holes 397 and the second radial communication holes 398 are radial through holes that allow the inside and outside of the first hollow cylindrical portion 391 to communicate with each other. The first radial communication holes 397 and the second radial communication holes 398 are formed at equal intervals in the circumferential direction and at positions on the first hollow cylindrical portion 391 where no axial communication holes 394 are formed. Specifically, the first radial communication holes 397 are at positions upper in the axial direction than the positions of the first radial depression 395, and the second radial communication holes 398 are formed between the first radial depression 395 and the second radial depression 396 in the axial direction.

The second hollow cylindrical portion 392 has a protrusion 399. The protrusion 399 radially internally protrudes from the inner surface of the second hollow cylindrical portion 392. The flange of the ball seat member 365 is mounted on the upper-side end surface of the protrusion 399. The gap between the inner surface of the protrusion 399 and the outer surface of the ball seat member 365 is sealed by the O ring 367, which is fitted in the ball seat member 365.

The cylinder 230 is held on the valve accommodation outer member 390 with the male thread 390a on the outer surface of the first hollow cylindrical portion 391 screwed on the female thread on the inner surface of the cylinder 230.

Configuration of Support Member 400

As illustrated in FIG. 3, the support member 400 includes a hollow cylindrical portion 401 and an internally facing portion 402. The hollow cylindrical portion 401 has a hollow cylindrical shape. The internally facing portion 402 radially internally extends from the lower-side end of the hollow cylindrical portion 401.

On the outer surface at the upper-side end of the hollow cylindrical portion 401, a male thread 403 is formed. The male thread 403 is screwed on the female thread on the cap 220. The support member 400 is held on the cap 220 with the male thread 403, which is formed on the outer surface of the hollow cylindrical portion 401, screwed on the female thread on the cap 220. The support member 400 holds the valve accommodation inner member 380 and the valve accommodation outer member 390 by holding the flange of the valve accommodation inner member 380 and the flange of the valve accommodation outer member 390 between the internally facing portion 402 and the front-wheel solenoid 310.

Configuration of Transmission Member 410

The transmission member 410 includes a first solid cylindrical portion 411 and a second solid cylindrical portion 412. The first solid cylindrical portion 411 and the second solid cylindrical portion 412 have solid cylindrical shapes of different diameters.

The second solid cylindrical portion 412 has an outer diameter smaller the inner diameter of the coil spring 415, and thus the second solid cylindrical portion 412 is inserted in the coil spring 415.

The first solid cylindrical portion 411 has an outer diameter larger than the inner diameter of the coil spring 415. The first solid cylindrical portion 411 has a groove formed on the outer surface of the first solid cylindrical portion 411. The upper-side end of the coil spring 415 is fitted in the groove.

The transmission member 410 and the coil spring 415 are accommodated in the upper-end depression 381 of the valve accommodation inner member 380.

The valve 317 and the coil spring 318 are accommodated in a depression 319, which is formed on the lower-side end surface of the front-wheel solenoid 310. The valve 317 has an axial through hole 317a. The axial through hole 317a is formed at a position facing the upper-end depression 381 of the valve accommodation inner member 380. The coil spring 318 applies, to the valve 317, axial urging force directed toward the upper-side end surface of the valve accommodation inner member 380.

With the configuration of the front-wheel passage switch unit 300 described hereinbefore, when supply of current to the coil 311 of the front-wheel solenoid 310 is stopped or when the current supplied to the coil 311 is less than a predetermined first reference current, the protrusion amount of the operation rod 314 protruding from the case 315 becomes less than a predetermined first reference amount, When the protrusion amount of the operation rod 314 is less than the first reference amount, the valve 317, which is mounted on the operation rod 314, does not rest on the upper-side end surface of the valve accommodation inner member 380. This releases open the opening on the upper end side of the inner axial communication hole 389*a*, which is formed in the valve accommodation inner member 380.

When the current supplied to the coil 311 of the front-wheel solenoid 310 is equal to or higher than the first reference current, the operation rod 314 moves in the lower side direction, and the protrusion amount of the operation rod 314 from the case 315 becomes equal to or larger than the first reference amount. When the protrusion amount of the operation rod 314 is equal to or larger than the first reference amount, the valve 317, which is mounted on the operation rod 314, rests on the upper-side end surface of the valve accommodation inner member 380 to close the opening on the upper end side of the inner axial communication hole 389*a*. In other words, when the protrusion amount of the operation rod 314 from the case 315 is equal to or larger than the first reference amount, the operation rod 314 protrudes to such a position that the valve 317 rests on the upper-side end surface of the valve accommodation inner member 380.

When the current supplied to the coil 311 of the front-wheel solenoid 310 is equal to or higher than a predetermined second reference current, which is higher than the first reference current, the operation rod 314 moves further in the lower side direction, and the protrusion amount of the operation rod 314 from the case 315 becomes equal to or larger than a predetermined second reference amount, which is larger than the first reference amount. When the protrusion amount of the operation rod 314 is equal to or larger than the second reference amount, the transmission member 410 and the push rod 322 are brought into contact with each other, and also, the push rod 322 and the valve body 321 are brought into contact with each other. In other words, the push rod 322 is held between the transmission member 410 and the valve body 321.

When the current supplied to the coil 311 of the front-wheel solenoid 310 is higher than the second reference current, and when the protrusion amount of the operation rod 314 from the case 315 is larger than the second reference amount, the operation rod 314 pushes the push rod 322 in the lower side direction through the transmission member 410. When the push rod 322 is pushed in the lower side direction, the valve body 321 is pushed by the push rod 322 away from the inclined surface 335*a* of the lower-end depression 335 of the valve-body seat member 330. In other words, when the protrusion amount of the operation rod 314 from the case 315 is larger than the second reference amount, the push rod 322 is pressed by the operation rod 314 to press the valve body 321 away from the inclined surface 335*a*.

When the supply of current to the coil 311 is stopped or when the current supplied to the coil 311 is less than the first reference current, the valve 317, which is mounted on the operation rod 314, releases the inner axial communication hole 389*a*, which is formed in the valve accommodation inner member 380, and the valve body 321 rests on the inclined surface 335*a* of the lower-end depression 335 of the valve-body seat member 330. This state will be hereinafter referred to as first switch state.

When the current supplied to the coil 311 is equal to or higher than the first reference current, the valve 317, which is mounted on the operation rod 314, closes the inner axial communication hole 389*a*, which is formed in the valve accommodation inner member 380, and the valve body 321 rests on the inclined surface 335*a* of the lower-end depression 335 of the valve-body seat member 330. This state will be hereinafter referred to as second switch state.

When the current supplied to the coil 311 is equal to or higher than the second reference current, the valve 317, which is mounted on the operation rod 314, closes the inner axial communication hole 389*a*, which is formed in the valve accommodation inner member 380, and the valve body 321 is away from the inclined surface 335*a* of the lower-end depression 335 of the valve-body seat member 330. This state will be hereinafter referred to as third switch state.

In a non-limiting example, the first reference current and the second reference current are respectively 0.4 A and 0.6 A.

When the current supplied to the coil 311 is higher than the second reference current, the valve 317, which is mounted on the operation rod 314, closes the inner axial communication hole 389*a*, which is formed in the valve accommodation inner member 380, and the inclined surface 331 of the conical portion 332 of the valve-body seat member 330 is away from the inclined surface on the conical depression 382*c* of the valve accommodation inner member 380. This state will be hereinafter referred to as fourth switch state. In the fourth switch state, the valve body 321 rests on the inclined surface 335*a* of the lower-end depression 335 of the valve-body seat member 330.

Operation of Front Fork 21

With the configuration of the front fork 21 described hereinbefore, the front-wheel spring 500 supports the weight of the motorcycle 1 and thus absorbs impact. The attenuation force generation unit 130 attenuates the vibration in the front-wheel spring 500.

Figure 5:
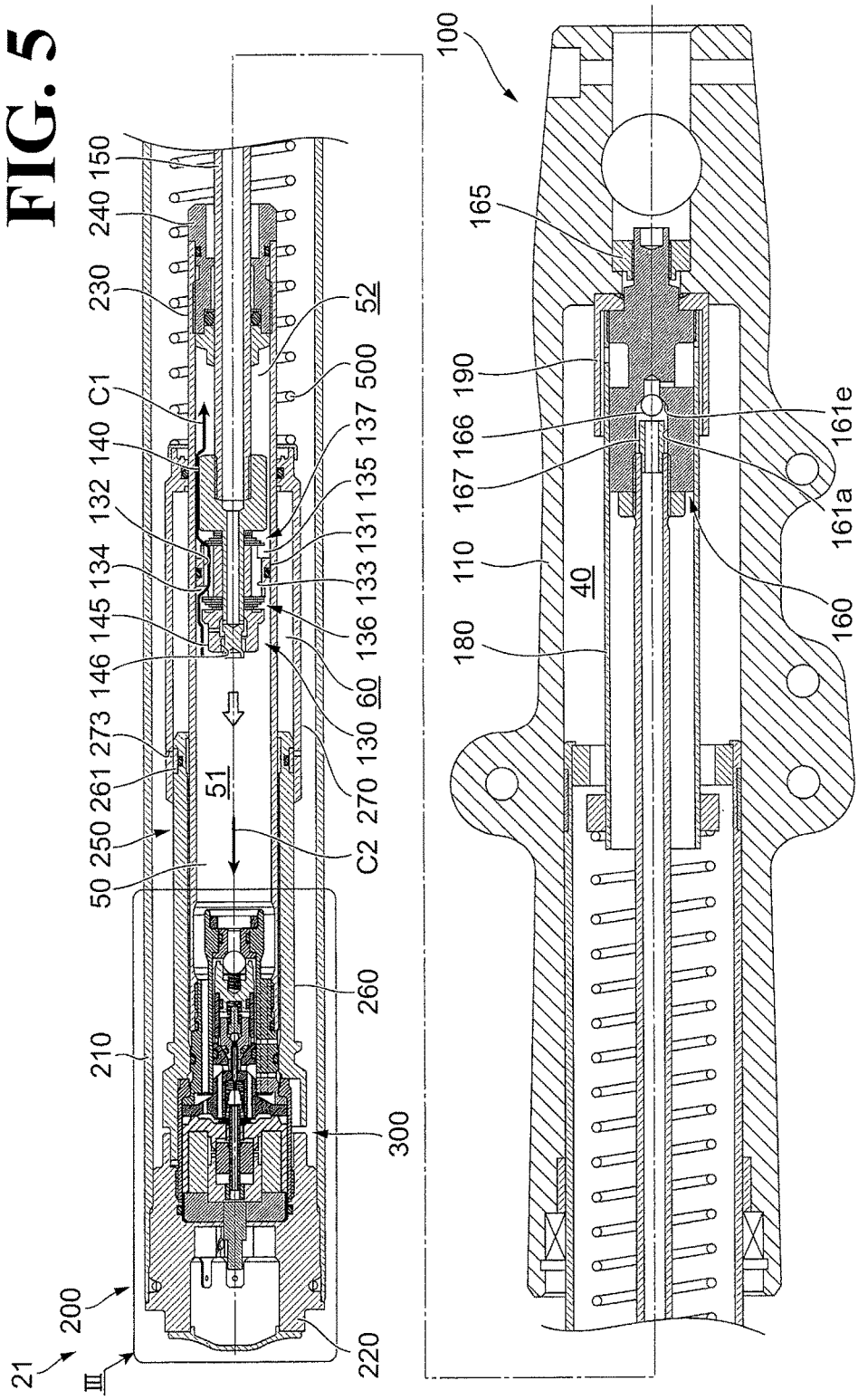
FIG. 5 illustrates how the front fork operates at the time of a compression stroke.

FIG. 5 illustrates how the front fork 21 operates at the time of a compression stroke.

In the compression stroke of the front fork 21, the piston 131 of the attenuation force generation unit 130 moves in the upper-side direction relative to the cylinder 230 as indicated by the outlined arrow. The movement of the piston 131 causes the oil in the first oil chamber 51 to be pressurized. This causes the lower-end side valve 137 covering the first through hole 132 to open and the oil to flow into the second oil chamber 52 through the first through hole 132 (see arrow C1). The oil flow from the first oil chamber 51 to the second oil chamber 52 is narrowed through the first through hole 132 and the lower-end side valve 137. This causes attenuation force for the compression stroke to be generated.

At the time of the compression stroke, the rod 150 enters the cylinder 230. The entry causes an amount of oil corresponding to the volume of the rod 150 in the cylinder 230 to be supplied to the jack chamber 60 or the reservoir chamber 40, which depends on the switch state selected by the front-wheel passage switch unit 300 (see arrow C2). The switch state selected by the front-wheel passage switch unit 300 as to which of the jack chamber 60 and the reservoir chamber 40 to supply the oil will be described later. Here, the attenuation force generation unit 130, the rod 150, the cylinder 230, and other elements function as a pump to supply the oil in the cylinder 230 to the jack chamber 60 or the reservoir chamber 40. In the following description, this pump will occasionally be referred to as "pump 600".

Figure 6:
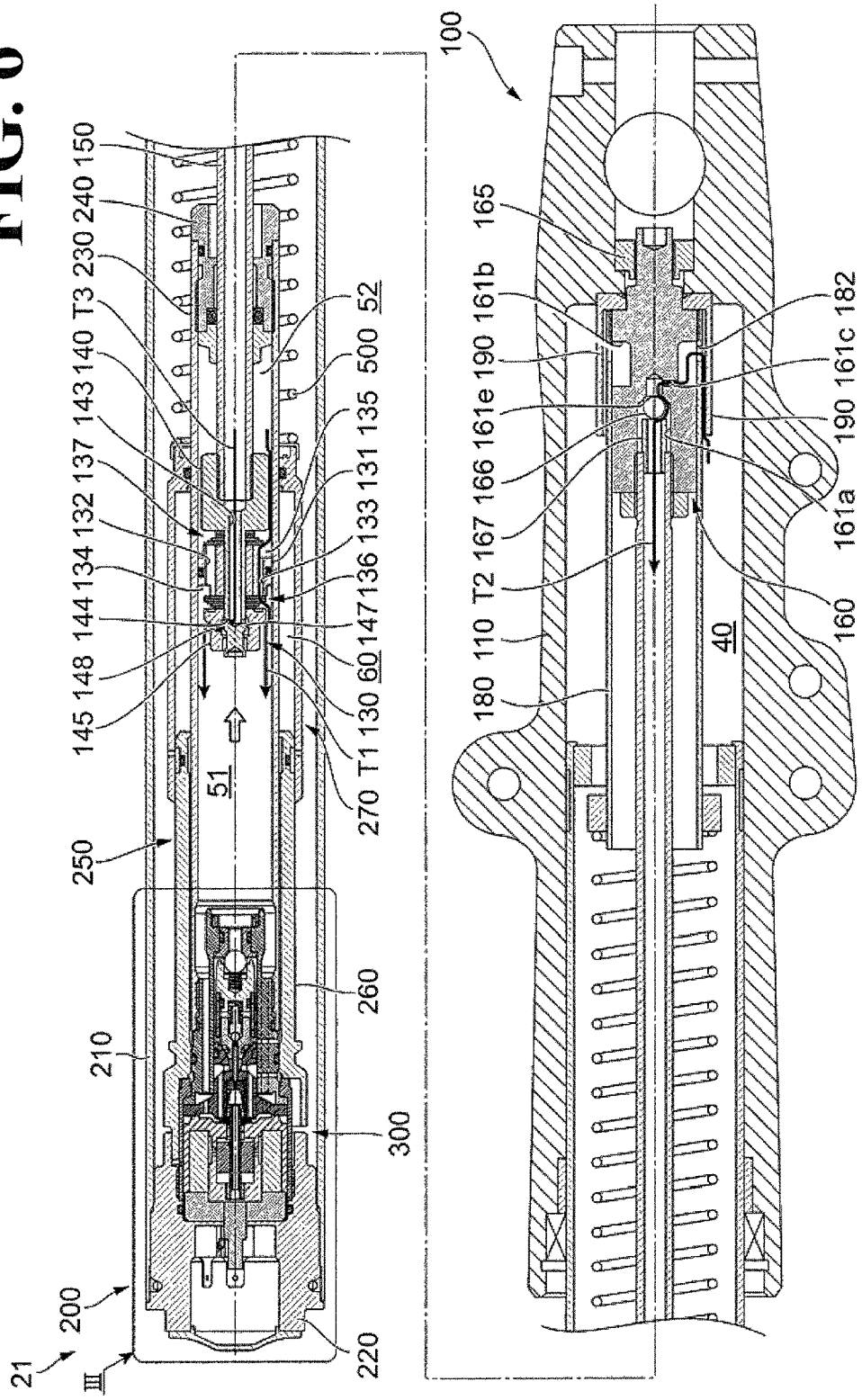
FIG. 6 illustrates how the front fork operates at the time of a rebound stroke.

FIG. 6 illustrates how the front fork 21 operates at the time of a rebound stroke.

In the rebound stroke of the front fork 21, the piston 131 of the attenuation force generation unit 130 moves in the lower-side direction relative to the cylinder 230 as indicated by the outlined arrow. The movement of the piston 131 causes the oil in the second oil chamber 52 to be pressurized. This causes the upper-end side valve 136 covering the second through hole 133 to open and the oil to flow into the first oil chamber 51 through the second through hole 133 (see arrow T1). The oil flow from the second oil chamber 52 to the first oil chamber 51 is narrowed through the second through hole 133 and the upper-end side valve 136. This causes attenuation force for the rebound stroke to be generated.

At the time of the rebound stroke, the rod 150 withdraws from the cylinder 230. The withdrawal causes an amount of oil corresponding to the volume of the rod 150 that has been in the cylinder 230 to be supplied from the reservoir chamber 40 to the first oil chamber 51. That is, the movement of the piston 131 in the lower-side direction causes the first oil chamber 51 to be depressurized and the oil in the reservoir chamber 40 to enter the first oil chamber 51. Specifically, the oil in the reservoir chamber 40 passes through the communication hole 182 of the support-member holding member 180 and the radial through hole 161c of the rod holding member 160, and enters the axial depression 161a of the rod holding member 160. Then, the oil moves the ball 166 in the upper-side direction and enters the rod 150 (see arrow T2). In the rod 150, the oil passes through the depression 143 of the piston bolt 140, the radial through hole 144, and the radial through hole 148 of the nut 145, and reaches the first oil chamber 51 (see arrow T3).

Thus, the communication hole 182 of the support-member holding member 180, the radial through hole 161c of the rod holding member 160, the axial depression 161a of the rod holding member 160, the inside of the rod 150, the depression 143 of the piston bolt 140, the radial through hole 144, the radial through hole 148 of the nut 145 function as intake passages through which oil is taken from the reservoir chamber 40 into the cylinder 230 (first oil chamber 51). The ball 166 and the inclined surface 161e, which is formed on the axial depression 161a of the rod holding member 160, function as a check valve that allows oil to flow from the reservoir chamber 40 into the inside of the rod 150 and that restricts discharge of the oil from the inside of the rod 150 to the reservoir chamber 40. The ball 166 and the inclined surface 161e will be referred to as "intake-side check valve Vc".

Flow of Oil in Accordance with Switch State Selected by Front-Wheel Passage Switch Unit 300

Figure 7:
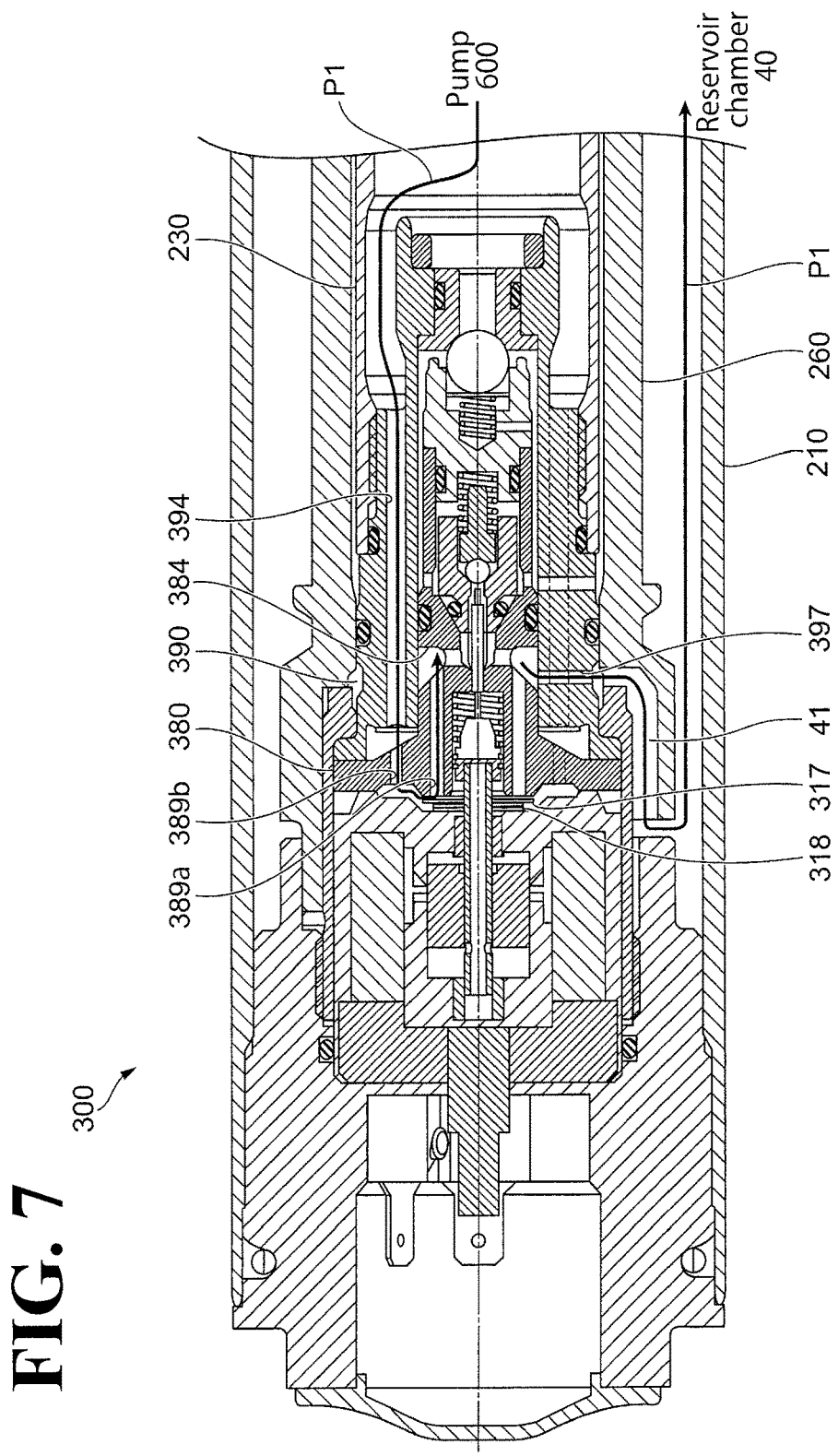
FIG. 7 illustrates a flow of oil in a front-wheel passage switch unit in a first switch state.

FIG. 7 illustrates a flow of oil in the front-wheel passage switch unit 300 in the first switch state.

When the front-wheel passage switch unit 300 is in the first switch state at the time of the compression stroke of the front fork 21, oil discharged from the pump 600, which is made up of members such as the attenuation force generation unit 130, the rod 150, and the cylinder 230, flows in the upper side direction through the axial communication holes 394, which are formed in the valve accommodation outer member 390 as indicated by arrow P1 in FIG. 7. The oil that has flown in the upper side direction through the axial communication holes 394, which are formed in the valve accommodation outer member 390, flows in the upper side direction through the outer axial communication hole 389b of the valve accommodation inner member 380, and then flows in the lower side direction through the inner axial communication hole 389a, which is open. Then, the oil flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the axial communication holes 394 of the valve accommodation outer member 390, the outer axial communication hole 389b and the inner axial communication hole 389a of the valve accommodation inner member 380, the first radial communication holes 397 of the valve accommodation outer member 390, and the discharge passage 41 function as a first communication passage R1 (see FIG. 11). Through the first communication passage R1, the cylinder 230 and the reservoir chamber 40 communicate with each other. The valve 317, which is mounted on the operation rod 314, the coil spring 318, and the upper-side end of the valve accommodation inner member 380 function as a first communication passage switch valve V1 (see FIG. 11). The first communication passage switch valve V1 opens and closes the first communication passage R1.

Figure 8:
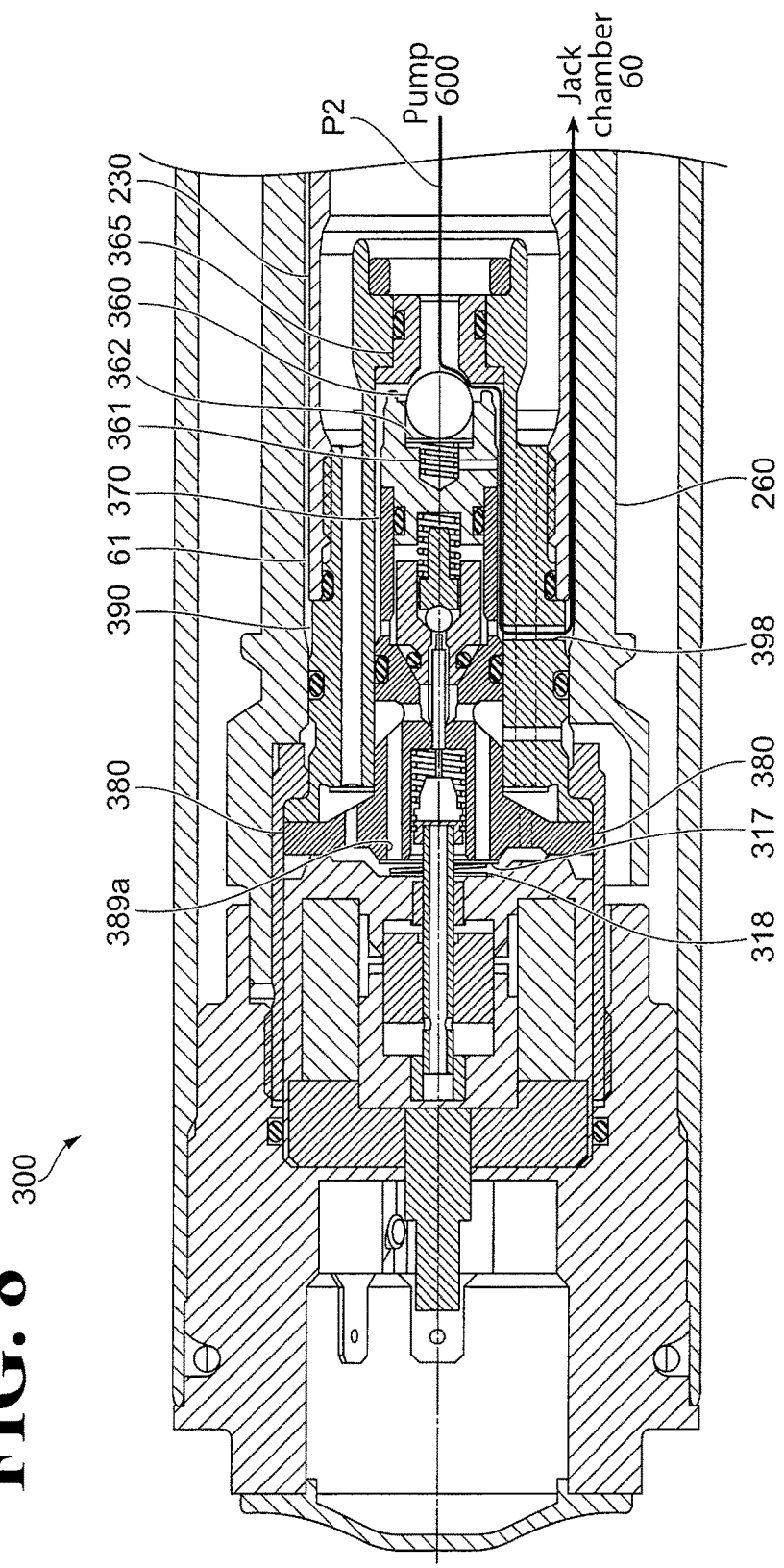
FIG. 8 illustrates a flow of oil in the front-wheel passage switch unit in a second switch state.

FIG. 8 illustrates a flow of oil in the front-wheel passage switch unit 300 in the second switch state.

When the front-wheel passage switch unit 300 is in the second switch state at the time of the compression stroke of the front fork 21, the valve 317, which is mounted on the operation rod 314, closes the inner axial communication hole 389a, which is formed in the valve accommodation inner member 380. This causes the oil discharged from the pump 600 to flow to the jack chamber 60 as indicated by arrow P2 in FIG. 8. Specifically, the oil discharged from the pump 600 pushes up the ball 360 against the urging force of the coil spring 361, and flows in the upper side direction through the gap between the outer surface of the valve accommodation inner member 380 and the inner surface of the valve accommodation outer member 390 and the gap between the outer surface of the accommodation member 370 and the inner surface of the valve accommodation outer member 390. Then, the oil flows to the outside of the valve accommodation outer member 390 through the second radial communication holes 398 of the valve accommodation outer member 390. The oil that has passed through the second radial communication holes 398 flows to the jack chamber 60 through the ring-shaped passage 61, which is defined between the outer surface of the cylinder 230 and the inner surface of the base member 260 of the front-wheel spring length adjustment unit 250.

Thus, the gap between the outer surface of the valve accommodation inner member 380 and the inner surface of the valve accommodation outer member 390, the gap between the outer surface of the accommodation member 370 and the inner surface of the valve accommodation outer member 390, the second radial communication holes 398 of the valve accommodation outer member 390, and the ring-shaped passage 61 function as a second communication passage R2 (see FIG. 11). Through the second communication passage R2, the cylinder 230 and the jack chamber 60 communicate with each other. The ball 360, the coil spring 361, the disc 362, and the ball seat member 365 function as a second communication passage switch valve V2 (see FIG. 11). The second communication passage switch valve V2 opens and closes the second communication passage R2. The second communication passage switch valve V2 also functions as a check valve that allows oil to flow from the inside of the cylinder 230 into the jack chamber 60 and that inhibits the oil from flowing from the jack chamber 60 into the cylinder 230.

Figure 9:
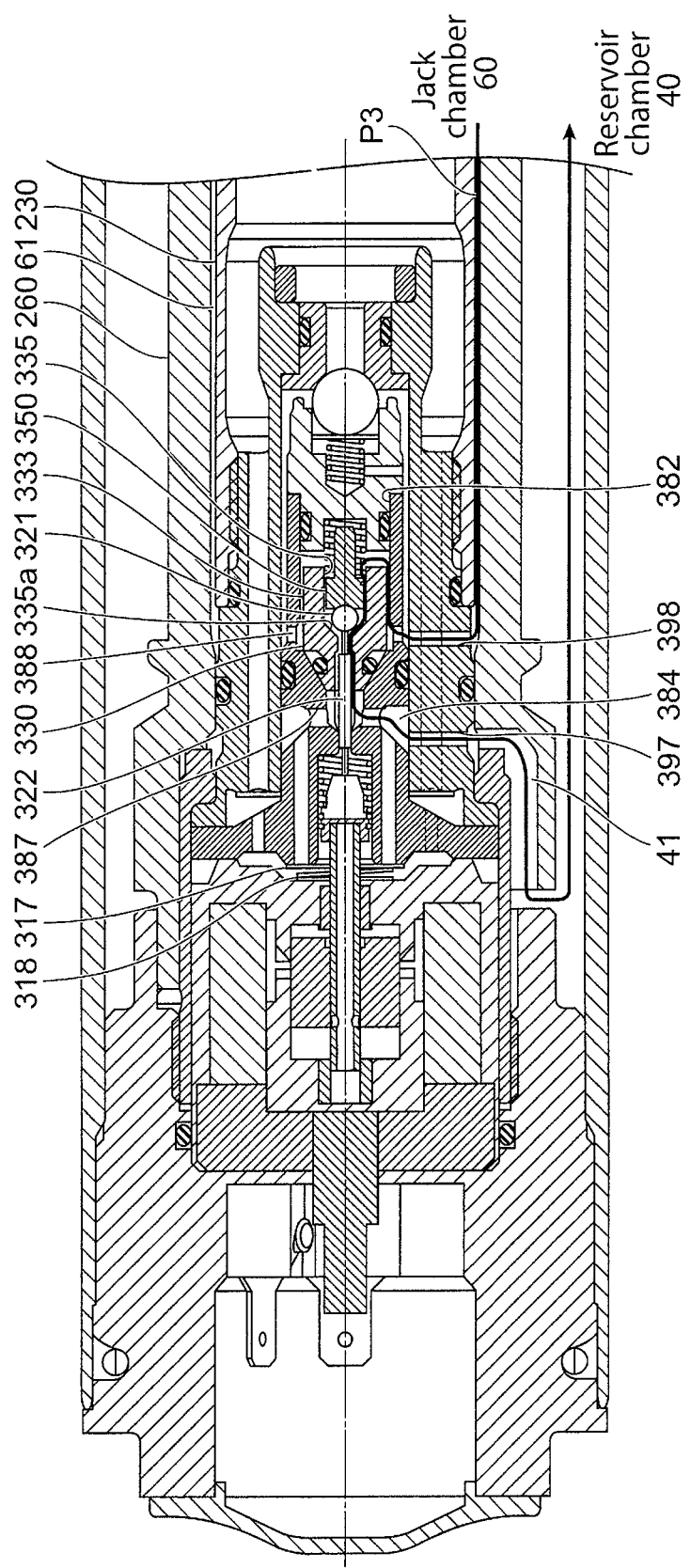
FIG. 9 illustrates a flow of oil in the front-wheel passage switch unit in a third switch state.

FIG. 9 illustrates a flow of oil in the front-wheel passage switch unit 300 in the third switch state.

When the front-wheel passage switch unit 300 is in the third switch state at the time of the compression stroke of the front fork 21, the oil in the jack chamber 60 flows to the reservoir chamber 40 as indicated by arrow P3 in FIG. 9. Specifically, the oil in the jack chamber 60 enters the lower-end depression 382 of the valve accommodation inner member 380 through the ring-shaped passage 61, which is defined between the outer surface of the cylinder 230 and the inner surface of the base member 260 of the front-wheel spring length adjustment unit 250, through the second radial communication holes 398 of the valve accommodation outer member 390, and through the second radial communication holes 388 of the valve accommodation inner member 380. The oil that has entered the lower-end depression 382 of the valve accommodation inner member 380 flows in the lower side direction through the gap between the valve accommodation inner member 380 and the outer surface of the solid cylindrical portion 333 of the valve-body seat member 330, and enters the lower-end depression 335 of the valve-body seat member 330. The oil that has entered the lower-end depression 335 of the valve-body seat member 330 flows in the upper side direction through the gap between the press member 350 and the valve body 321 and the gap between the push rod 322 and the valve-body seat member 330, and passes through the first radial communication holes 387 of the valve accommodation inner member 380. The oil that has passed through the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap between the valve accommodation inner member 380 and the outer surface of the solid cylindrical portion 333 of the valve-body seat member 330, the gap between the press member 350 and the valve body 321, the gap between the push rod 322 and the valve-body seat member 330, the first radial communication holes 387 of the valve accommodation inner member 380, the first radial communication holes 397 of the valve accommodation outer member 390, and the discharge passage 41 function as a third communication passage R3 (see FIG. 11). Through the third communication passage R3, the jack chamber 60 and the reservoir chamber 40 communicate with each other. The valve body 321 and the inclined surface 335a of the lower-end depression 335 of the valve-body seat member 330 function as a third communication passage switch valve V3 (see FIG. 11). The third communication passage switch valve V3 opens and closes the third communication passage R3.

FIG. 10 illustrates a flow of oil in the front-wheel passage switch unit 300 in the fourth switch state.

When the front-wheel passage switch unit 300 is in the fourth switch state at the time of the compression stroke of the front fork 21, the oil in the jack chamber 60 flows to the reservoir chamber 40 as indicated by arrow P4 in FIG. 10. Specifically, the oil in the jack chamber 60 enters the lower-end depression 382 of the valve accommodation inner member 380 through the ring-shaped passage 61, the second radial communication holes 398 of the valve accommodation outer member 390, and the second radial communication holes 388 of the valve accommodation inner member 380. The oil that has entered the lower-end depression 382 of the valve accommodation inner member 380 flows in the upper side direction through the gap defined by the inclined surface 331 of the conical portion 332 of the valve-body seat member 330, the O ring 337, and the inclined surface on the conical depression 382c of the valve accommodation inner member 380, and passes through the first radial communication holes 387 of the valve accommodation inner member 380. The oil that has passed the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap defined by the inclined surface 331 of the valve-body seat member 330, the O ring 337, and the inclined surface on the conical depression 382c of the valve accommodation inner member 380, the first radial communication holes 387 of the valve accommodation inner member 380, the first radial communication holes 397 of the valve accommodation outer member 390, and the discharge passage 41 function as a fourth communication passage R4 (not illustrated). Through the fourth communication passage R4, the jack chamber 60 and the reservoir chamber 40 communicate with each other. The inclined surface 331 of the conical portion 332 of the valve-body seat member 330, the O ring 337, and the inclined surface on the conical depression 382c of the valve accommodation inner member 380 function as a fourth communication passage switch valve V4 (not illustrated). The fourth communication passage switch valve V4 opens and closes the fourth communication passage R4.

Change from Third Switch State to Fourth Switch State of Front-Wheel Passage Switch Unit 300

When the front-wheel passage switch unit 300 is in the third switch state, the oil in the jack chamber 60 flows to the reservoir chamber 40 as indicated by arrow P3 illustrated in FIG. 9. This flow of the oil causes the amount of the oil in the jack chamber 60 to decrease, causing a reduction in length of the front-wheel spring 500. The reduction in length of the spring 500 causes the pressure in the jack chamber 60 to decrease. As a result, the pressure in a back pressure chamber defined between the valve-body seat member 330 and the accommodation member 370 at the time when the front-wheel passage switch unit 300 is in the third switch state is lower than the pressure in the back pressure chamber at the time when the front-wheel passage switch unit 300 is in the second switch state. This causes the valve-body seat member 330 to start to move in the lower side direction.

When the push rod 322 moves the valve body 321 further in the lower side direction than when the passage switch unit 300 is in the third switch state, the gap between the valve body 321 and the inclined surface 335a of the lower-end depression 335 of the valve-body seat member 330 is enlarged. As a result, the pressure in the jack chamber 60 further decreases, causing a further decrease in the pressure in the back pressure chamber. The further decrease in the pressure in the back pressure chamber causes the valve-body seat member 330 to move in the lower side direction. This causes the inclined surface 331 of the conical portion 332 of the valve-body seat member 330 to move away from the inclined surface on the conical depression 382c of the valve accommodation inner member 380. Thus, the third switch state changes to the fourth switch state.

Communication Passages Open or Closed in Accordance with Switch State Selected by Front-Wheel Passage Switch Unit 300

Figure 11A:
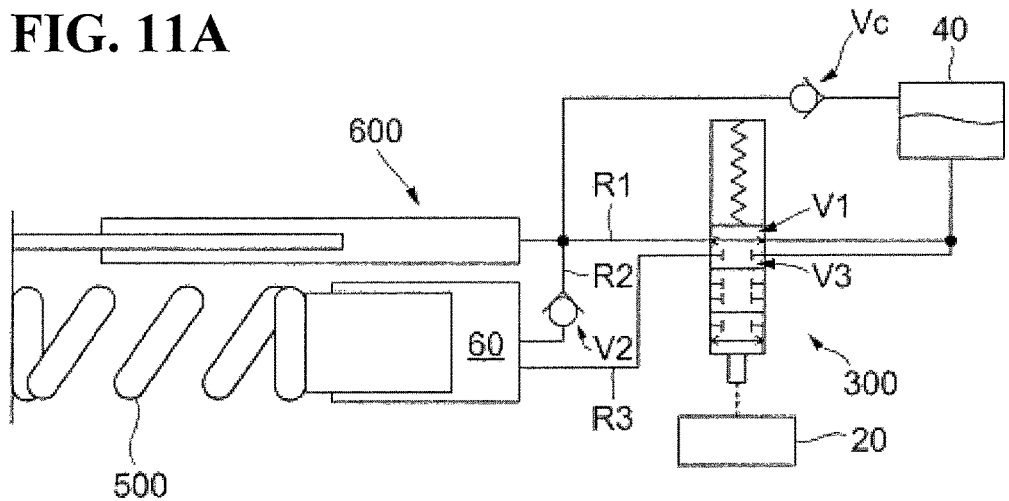
FIG. 11A schematically illustrates whether a first communication passage, a second communication passage, and a third communication passage are open or closed when the front-wheel passage switch unit is in the first switch state.
Figure 11B:
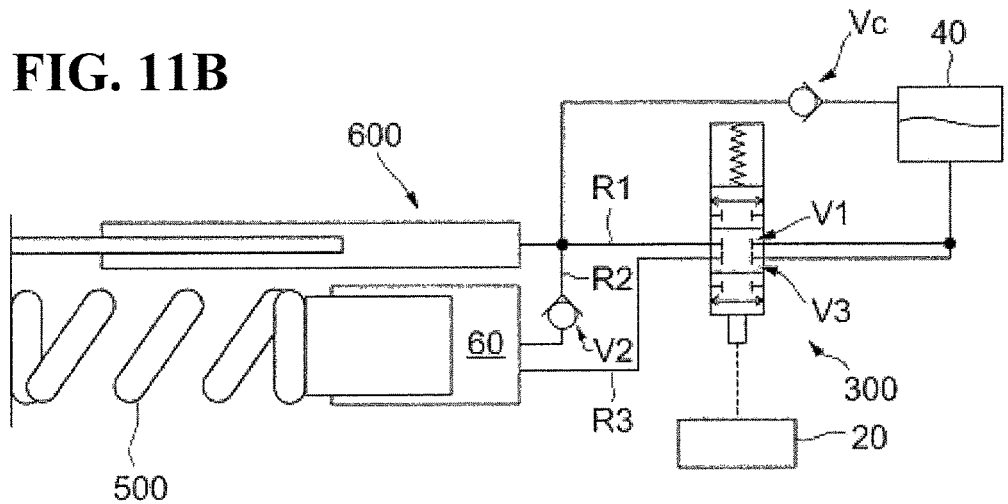
FIG. 11B schematically illustrates whether the first communication passage, the second communication passage, and the third communication passage are open or closed when the front-wheel passage switch unit is in the second switch state.
Figure 11C:
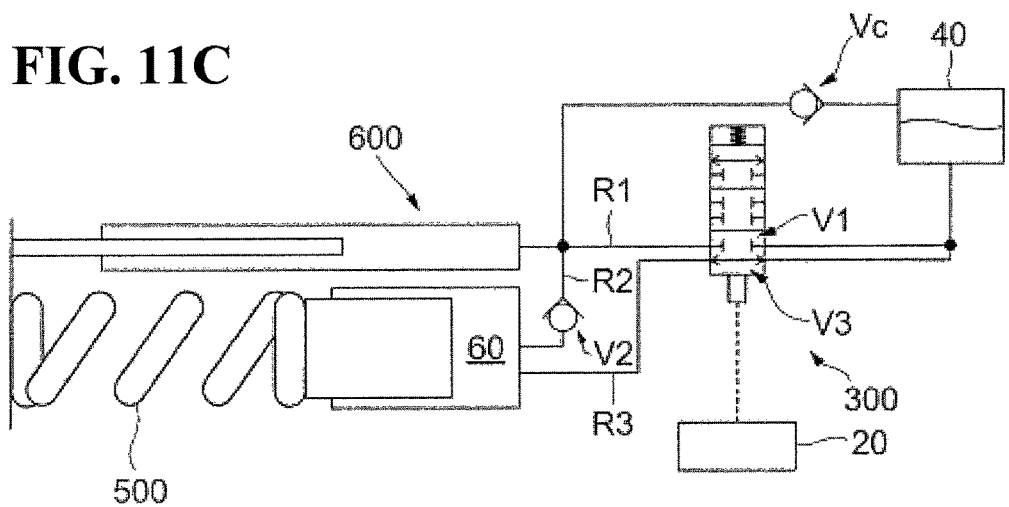
FIG. 11C schematically illustrates whether the first communication passage, the second communication passage, and the third communication passage are open or closed when the front-wheel passage switch unit is in the third switch state or the fourth switch state.

FIG. 11A schematically illustrates whether the first communication passage R1, the second communication passage R2, and the third communication passage R3 are open or closed when the front-wheel passage switch unit 300 is in the first switch state. FIG. 11B schematically illustrates whether the first communication passage R1, the second communication passage R2, and the third communication passage R3 are open or closed when the front-wheel passage switch unit 300 is in the second switch state. FIG. 11C schematically illustrates whether the first communication passage R1, the second communication passage R2, and the third communication passage R3 are open or closed when the front-wheel passage switch unit 300 is in the third switch state or the fourth switch state.

As illustrated in FIG. 11A, when the current supplied to the coil 311 of the front-wheel solenoid 310 is less than the first reference current, the front-wheel passage switch unit 300 is in the first switch state. That is, the first communication passage switch valve V1 is open and the third communication passage switch valve V3 is closed. This causes the oil discharged from the pump 600 to reach the reservoir chamber 40 through the first communication passage R1. In this case, the oil discharged from the pump 600 does not have such a high pressure as to open the second communication passage switch valve V2. Hence, the oil does not flow through the second communication passage R2. In other words, since the first communication passage switch valve V1 is open, the second communication passage switch valve V2 is closed. In the first switch state, the oil in the jack chamber 60 does not increase or decrease.

As illustrated in FIG. 11B, when the current supplied to the coil 311 of the front-wheel solenoid 310 is equal to or higher than the first reference current, the front-wheel passage switch unit 300 is in the second switch state. That is, the first communication passage switch valve V1 and the third communication passage switch valve V3 are closed. In this case, the oil discharged from the pump 600 opens the second communication passage switch valve V2 to reach the jack chamber 60 through the second communication passage R2. In the second switch state, the amount of the oil in the jack chamber 60 increases.

As illustrated in FIG. 11C, when the current supplied to the coil 311 of the front-wheel solenoid 310 is higher than the second reference current, and when the front-wheel passage switch unit 300 is in the third switch state, that is, the first communication passage switch valve V1 is closed and the third communication passage switch valve V3 is open, the oil in the jack chamber 60 reaches the reservoir chamber 40 through the third communication passage R3. In the third switch state, the amount of the oil in the jack chamber 60 decreases.

When the current supplied to the coil 311 of the front-wheel solenoid 310 is higher than the second reference current, the front-wheel passage switch unit 300 is in the fourth switch state. That is, the first communication passage switch valve V1 is closed and the fourth communication passage switch valve V4 is open. This causes the oil in the jack chamber 60 to reach the reservoir chamber 40 through the fourth communication passage R4.

The passage defined in the fourth switch state by the gap defined by the inclined surface 331 of the conical portion 332 of the valve-body seat member 330, the O ring 337, and the inclined surface on the valve accommodation inner member 380 is wider than the passage defined in the third switch state by the gap between the valve accommodation inner member 380 and the outer surface of the solid cylindrical portion 333 of the valve-body seat member 330.

The passage defined in the third switch state by the gap between the valve body 321 and the inclined surface 335a on the valve-body seat member 330 is narrower than the passage defined in the third switch state by the gap between the valve accommodation inner member 380 and the outer surface of the solid cylindrical portion 333 of the valve-body seat member 330. Therefore, when the passage switch unit 300 is in the fourth switch state, the amount of the oil in the jack chamber 60 decreases more quickly than when the passage switch unit 300 is in the third switch state.

Up-and-Down of Vehicle Height

In the front fork 21 operating in the above-described manner, when the front-wheel passage switch unit 300 is in the second switch state, the oil discharged from the pump 600 at the time of the compression stroke flows into the jack chamber 60, increasing the amount of oil in the jack chamber 60. The increase in the amount of oil in the jack chamber 60 causes the upper-side end support member 270 to move in the lower-side direction relative to the base member 260 of the front-wheel spring length adjustment unit 250. The movement of the upper-side end support member 270 in the lower-side direction relative to the base member 260 causes the spring length of the front-wheel spring 500 to shorten. The shortened spring length of the front-wheel spring 500 causes the spring force of the front-wheel spring 500 in pressing the upper-side end support member 270 to increase as compared with the spring force before the movement of the upper-side end support member 270 relative to the base member 260. This causes an increase in preset load (preload), which is an amount of load that keeps the position of the body frame 11 unchanged relative to the position of the front wheel 2 even when force acts from the body frame 11 toward the front wheel 2 side. In this case, the amount of depression of the front fork 21 is smaller when the same amount of force acts in the axial direction from the body frame 11 (seat 19) side. Thus, when the spring length of the front-wheel spring 500 is shortened due to the movement of the upper-side end support member 270 relative to the base member 260, the height of the seat 19 increases as compared with the height of the seat 19 before the movement of the upper-side end support member 270 relative to the base member 260 (that is, the vehicle height increases).

When the front-wheel passage switch unit 300 is in the third switch state or the fourth switch state, the amount of oil in the jack chamber 60 decreases. The decrease in the amount of oil causes the upper-side end support member 270 to move in the upper-side direction relative to the base member 260 of the front-wheel spring length adjustment unit 250. The movement of the upper-side end support member 270 in the upper-side direction relative to the base member 260 causes the spring length of the front-wheel spring 500 to increase. The increased spring length of the front-wheel spring 500 causes the spring force of the front-wheel spring 500 in pressing the upper-side end support member 270 to reduce as compared with the spring force before the movement of the upper-side end support member 270 relative to the base member 260. This causes the preset load (pre-load) to decrease, and the amount of depression of the front fork 21 is larger when the same amount of force acts in the axial direction from the body frame 11 (seat 19) side. Thus, when the spring length of the front-wheel spring 500 is increased due to the movement of the upper-side end support member 270 in the upper-side direction relative to the base member 260, the height of the seat 19 decreases as compared with the height of the seat 19 before the movement of the upper-side end support member 270 relative to the base member 260 (that is, the vehicle height decreases). When the front-wheel passage switch unit 300 is in the fourth switch state, the amount of the oil in the jack chamber 60 decreases more quickly than when the front-wheel passage switch unit 300 is in the third switch state, as described above. Hence, when the front-wheel passage switch unit 300 is in the fourth switch state, the vehicle height decreases more quickly than when the front-wheel passage switch unit 300 is in the third switch state.

When the front-wheel passage switch unit 300 is in the first switch state, the oil discharged from the pump 600 at the time of the compression stroke flows into the reservoir chamber 40, and the amount of oil in the jack chamber 60 does not increase or decrease. Thus, the height of the seat 19 is maintained (that is, the vehicle height is maintained).

As described above, in this embodiment, the front-wheel passage switch unit 300 functions as an example of the actuator that is driven when supplied with current and that changes the relative position of the body of the vehicle relative to the axle of the wheel of the vehicle so as to change the vehicle height in consequence.

Opening Easiness of Third Communication Passage Switch Valve V3

As described above, the valve body 321 and the inclined surface 335a of the valve-body seat member 330 function as the third communication passage switch valve V3 to open and close the third communication passage R3. The valve body 321 is brought into contact with the inclined surface 335a to close the third communication passage R3. While the third communication passage R3 is closed, the cross-sectional area Sv of the contact portion of the valve body 321 which is in contact with the inclined surface 335a in the direction perpendicular to the axial direction is a pressure receiving area for receiving a force exerted to the valve body 321 upwardly (in a direction reverse to the direction of pressing by the push rod 322). The force exerted to the valve body 321 upwardly is spring force of the coil spring 340+ pressure in the lower-end depression 335 of the valve-body seat member 330 (pressure in the jack chamber 60)×cross-sectional area Sv.

Meanwhile, the cross-sectional area Sp of the third shaft 322c of the push rod 322 in the direction perpendicular to the axial direction is a pressure receiving area for receiving a pressure in the upper-end depression 381 of the valve accommodation inner member 380 (hereinafter referred to as "push-rod back pressure"). In other words, the cross-sectional area Sp is a pressure receiving area for receiving a force exerted to the push rod 322 in such a direction that the push rod 322 presses the valve body 321 due to discharge of the oil from the pump 600.

In this embodiment, the cross-sectional area Sv of the contact portion of the valve body 321 in contact with the inclined surface 335a is set to be approximately equal to or slightly larger than the cross-sectional area Sp of the third shaft 322c of the push rod 322.

When the load on the motorcycle 1 is excessively heavier than supposed, the length of the front-wheel spring 500 is decreased to increase the oil pressure in the jack chamber 60 even if the position of the upper-side end support member 270 is the same relative to the base member 260 of the front-wheel spring length adjustment unit 250. This accordingly increases the pressure in the lower-end depression 335 of the valve-body seat member 330 accommodating the valve body 321, which may cause difficulty in opening the third communication passage switch valve V3. When difficulty is caused in opening the third communication passage switch valve V3, supply of a current higher than the second reference current to the coil 311 of the front-wheel solenoid 310 of the front-wheel passage switch unit 300 may not cause the third communication passage switch valve V3 to be open, which may hinder decreasing of the vehicle height.

In this embodiment, the through hole 317a is formed at the position in the valve 137 which faces the upper-end depression 381 of the valve accommodation inner member 380. Consequently, even when the front-wheel passage switch unit 300 is in the second switch state, the push-rod back pressure pulses between a range lower than the pressure in the jack chamber 60 and a range higher than the pressure in the jack chamber 60 in accordance with expansion and contraction of the front fork 21. The cross-sectional area Sv of the valve body 321 is set to be approximately equal to or slightly larger than the cross-sectional area Sp of the push rod 322. Under this setting, even when the front-wheel passage switch unit 300 is in the second switch state, the push rod 322 presses down the valve body 321 when the push-rod back pressure is higher than the pressure in the jack chamber 60. Therefore, in the process of shifting from the second switch state to the third switch state, a thrust slightly larger than the thrust of the front-wheel solenoid 310 in the second switch state is generated to cause the push rod 322 to press down the valve body 321. That is, a thrust slightly larger than the thrust of the front-wheel solenoid 310 in the second switch state is generated to open the third communication passage switch valve V3.

In this manner, with the configuration of this embodiment, even if the valve opening load of the third communication passage switch valve V3 is increased by an unexpected factor such as a sticking phenomenon of the valve body 321 due to overload and neglect over time, the discharge pressure from the pump 600 is utilized to facilitate opening of the third communication passage switch valve V3.

It is noted that the cross-sectional area Sv of the valve body 321 may be set to be slightly larger than the cross-sectional area Sp of the push rod 322 so as to prevent the push rod 322 from pressing down the valve body 321 when the front-wheel passage switch unit 300 is in the second switch state and when the push-rod back pressure is higher than the pressure in the jack chamber 60.

Closing Easiness of Third Communication Passage Switch Valve V3

In this embodiment, the cross-sectional area Sc of the second solid cylindrical portion 352 of the press member 350 in the direction perpendicular to the axial direction is set to be larger than the cross-sectional area Sv of the contact portion of the valve body 321 which is in contact with the inclined surface 335a.

In order to shift the front-wheel passage switch unit 300 from the third switch state to the second switch state or the first switch state, the current supplied to the coil 311 of the front-wheel solenoid 310 is decreased to a level less than the second reference current so as to change the protrusion amount of the operation rod 314 from the case 315 to a level less than the second reference amount. In this case, when the force exerted to the press member 350 in the direction for pressing the valve body 321 is larger than push-rod back pressure×cross-sectional area Sp of the push rod 322, the third communication passage switch valve V3 is closed.

In this embodiment, since the accommodation member 370 includes the radial through holes 375 penetrating in the radial direction to communicate the inside of the lower-end depression 372 and the outside of the accommodation member 370 with each other, the axial through hole 376 communicates with the jack chamber 60. Therefore, the lower end portion of the second solid cylindrical portion 352 of the press member 350, which is an end portion on the side opposite to the valve body 321 side, receives the pressure of the jack chamber 60. As a result, the force exerted to the press member 350 in the direction for pressing the valve body 321 is a sum of the spring force of the coil spring 340 and the pressure in the jack chamber 60×cross-sectional area Sc. That is, the force exerted to the press member 350 in the direction for pressing the valve body 321 in this embodiment is larger than in a configuration in which the lower end portion of the second solid cylindrical portion 352 of the press member 350 does not receive the pressure of the jack chamber 60 or than in a configuration in which the lower end portion of the second solid cylindrical portion 352 receives a pressure (such as a pressure in the lower-end depression 335 of the valve-body seat member 330) lower than the pressure of the jack chamber 60. As a result, with the configuration of this embodiment, the third communication passage switch valve V3 can be closed more quickly than without the configuration of this embodiment.

As described above, the through hole 317a is formed at the position in the valve 317 which faces the upper-end depression 381 of the valve accommodation inner member 380. Consequently, even when the front-wheel passage switch unit 300 is in the third switch state and the fourth switch state, the push-rod back pressure pulses between a range lower than the pressure in the jack chamber 60 and a range higher than the pressure in the jack chamber 60 in accordance with expansion and contraction of the front fork 21.

In this embodiment, the cross-sectional area Sc of the second solid cylindrical portion 352 of the press member 350 is set to be larger than the cross-sectional area Sv of the valve body 321 (cross-sectional area Sc>cross-sectional area Sv). That is, as described above, since the cross-sectional area Sv of the valve body 321 is set to be approximately equal to or slightly larger than the cross-sectional area Sp of the third shaft 322c of the push rod 322, the cross-sectional area Sc of the second solid cylindrical portion 352 of the press member 350 is larger than the cross-sectional area Sp of the third shaft 322c of the push rod 322 (cross-sectional area Sc>cross-sectional area Sp). Therefore, with the configuration of this embodiment, the force exerted to the press member 350 in the direction for pressing the valve body 321 is larger than with the configuration in which the cross-sectional area Sc of the press member 350 is equal to or smaller than the cross-sectional area Sv of the valve body 321. This causes the third communication passage switch valve V3 to be closed more quickly. Consequently, as described above, the configuration of this embodiment facilitates quicker opening of the third communication passage switch valve V3 in shifting from the first switch state or the second switch state to the third switch state and also facilitates quicker closing of the third communication passage switch valve V3 in shifting from the third switch state to the first switch state or the second switch state.

In order to shift the front-wheel passage switch unit 300 from the fourth switch state to the first switch state or the second switch state, the current supplied to the coil 311 of the front-wheel solenoid 310 is decreased to a level less than the second reference current so as to change the protrusion amount of the operation rod 314 from the case 315 to a level less than the second reference amount. In this case, the configuration of this embodiment also ensures quicker closing of the fourth communication passage switch valve V4.

The valve-body seat member 330 is pressed and moved upwardly by the valve body 321 pressed by the press member 350 so as to close the fourth communication passage switch valve V4. The force exerted on the press member 350 of this embodiment in the direction for pressing the valve body 321 (valve-body seat member 330) is larger than in the configuration in which the lower end portion of the second solid cylindrical portion 352 of the press member 350 does not receive the pressure of the jack chamber 60 or than in the configuration in which the lower end portion of the second solid cylindrical portion 352 receives a pressure smaller than the pressure of the jack chamber 60. Consequently, the configuration of this embodiment makes it possible to close the fourth communication passage switch valve V4 more quickly than when the configuration of this embodiment is not adopted. Therefore, the configuration of this embodiment facilitates quicker closing of the fourth communication passage switch valve V4 in shifting from the fourth switch state to the first switch state or the second switch state.

Configuration of Rear Suspension 22

The rear suspension 22 is disposed between the body 10 and the rear wheel 3 of the motorcycle 1, and supports the rear wheel 3. The rear suspension 22 includes an axle side unit, a body side unit, and a rear-wheel spring 502 (see FIG. 1). The axle side unit is mounted on the axle of the rear wheel 3. The body side unit is mounted on the body 10. The rear-wheel spring 502 is disposed between the axle side unit and the body side unit, and absorbs vibrations transmitted to the rear wheel 3 caused by the roughness of the ground surface. The rear-wheel spring 502 has an upper-side end supported on the body side unit and has a lower-side end supported on the axle side unit.

The axle side unit includes an attenuation force generation unit, a rod 152 (see FIG. 1), and a spring lower-side end support member 153 (see FIG. 1). The attenuation force generation unit generates attenuation force utilizing viscous resistance of oil. The rod 152 holds the attenuation force generation unit. The spring lower-side end support member 153 supports the lower-side end of the rear-wheel spring 502.

The body side unit includes a cylinder 232 (see FIG. 1), a rear-wheel spring length adjustment unit 252 (see FIG. 1), and a rear-wheel passage switch unit 302 (see FIG. 1). The attenuation force generation unit is inserted in the cylinder 232. The rear-wheel spring length adjustment unit 252 supports the upper-side end of the rear-wheel spring 502 and adjusts (changes) the length of the rear-wheel spring 502. The rear-wheel passage switch unit 302 is mounted outside of the cylinder 232 to switch among passages of oil.

The rear suspension 22 also includes a reservoir chamber (which is the storage chamber) and a pump. The reservoir chamber stores the oil. The pump includes the cylinder 232. When the relative distance between the body 10 and the rear wheel 3 increases, the pump takes into the cylinder 232 the oil stored in the reservoir chamber. When the relative distance between the body 10 and the rear wheel 3 decreases, the pump discharges the oil out of the cylinder 232.

Similarly to the front-wheel spring length adjustment unit 250 of the front fork 21, the rear-wheel spring length adjustment unit 252 includes a base member 253 and an upper-side end support member 254. The base member 253 is secured to a side of the body frame 11. The upper-side end support member 254 supports the upper-side end of the rear-wheel spring 502 and moves in the axial direction relative to the base member 253 so as to change the length of the rear-wheel spring 502. The rear-wheel spring length adjustment unit 252 includes a jack chamber (which is the accommodation chamber) to accommodate oil. The upper-side end support member 254 supports the upper-side end of the rear-wheel spring 502. The rear-wheel spring length adjustment unit 252 adjusts the length of the rear-wheel spring 502 in accordance with the amount of oil in the jack chamber.

The rear suspension 22 also includes a rear-wheel relative position detector 282 (which is the relative position detector) (see FIG. 12) to detect the position, relative to the body frame 11, of the member to support the upper-side end of the rear-wheel spring 502. In a non-limiting embodiment, the rear-wheel relative position detector 282 detects the amount of displacement of the upper-side end support member 254 in the axial direction relative to the base member 253, that is, the amount of displacement of the upper-side end support member 254 in the axial direction relative to the body frame 11. In a non-limiting embodiment, a coil is wound around the outer surface of the base member 253, and the upper-side end support member 254 is made of a magnetic material. Based on the impedance of the coil, which changes in accordance with displacement of the upper-side end support member 254 in the vertical direction relative to the base member 253, the rear-wheel relative position detector 282 detects the amount of displacement of the upper-side end support member 254.

Open or Closed States and Switch States of Communication Passages of Rear-Wheel Passage Switch Unit 302

The rear-wheel passage switch unit 302 has a configuration and functions similar to the configuration and functions of the front-wheel passage switch unit 300 of the front fork 21. Specifically, the rear-wheel passage switch unit 302 includes a first communication passage R1, a second communication passage R2, and a third communication passage R3. The first communication passage R1 allows the inside of the cylinder 232 and the reservoir chamber to communicate with each other. The second communication passage R2 allows the inside of the cylinder 232 and the jack chamber to communicate with each other. The third communication passage R3 allows the jack chamber and the reservoir chamber to communicate with each other. The rear-wheel passage switch unit 302 also includes a first communication passage switch valve V1, a second communication passage switch valve V2, and a third communication passage switch valve V3. The first communication passage switch valve V1 opens and closes the first communication passage R1. The second communication passage switch valve V2 opens and closes the second communication passage R2. The third communication passage switch valve V3 opens and closes the third communication passage R3.

When the current supplied to a coil of a rear-wheel solenoid of the rear-wheel passage switch unit 302 is less than the first reference current, and when the protrusion amount of the operation rod of the rear-wheel passage switch unit 302 from the case is less than the first reference amount, the rear-wheel passage switch unit 302 is in a first switch state, in which the first communication passage switch valve V1 is open and the third communication passage switch valve V3 is closed. This causes the oil discharged from the pump to reach the reservoir chamber through the first communication passage R1. In this case, since the oil discharged from the pump does not have such a high pressure as to open the second communication passage switch valve V2, the oil does not flow through the second communication passage R2. In other words, since the first communication passage switch valve V1 is open, the second communication passage switch valve V2 is closed. In the first switch state, the oil in the jack chamber does not increase nor decrease, and consequently, the vehicle height remains unchanged.

When the current supplied to the coil of the rear-wheel solenoid of the rear-wheel passage switch unit 302 is equal to or higher than the first reference current and when the protrusion amount of the operation rod from the case is equal to or larger than the first reference amount, the rear-wheel passage switch unit 302 closes the first communication passage R1. In this case, when the protrusion amount of the operation rod from the case is less than the second reference amount, the rear-wheel passage switch unit 302 is in a second switch state, in which the third communication passage R3 is closed. That is, the first communication passage switch valve V1 and the third communication passage switch valve V3 are closed. This causes the oil discharged from the pump to open the second communication passage switch valve V2 and reach the jack chamber. In the second switch state, the amount of oil in the jack chamber increases to increase the vehicle height.

When the current supplied to the coil of the rear-wheel solenoid of the rear-wheel passage switch unit 302 is higher than the second reference current and when the protrusion amount of the operation rod from the case is larger than the second reference amount, the rear-wheel passage switch unit 302 is in a third switch state, in which the third communication passage R3 is open. That is, the first communication passage switch valve V1 is closed and the third communication passage switch valve V3 is open. This causes the oil in the jack chamber to reach the reservoir chamber through the third communication passage R3. In the third switch state, the amount of oil in the jack chamber decreases to decrease the vehicle height.

When the current supplied to the coil of the rear-wheel solenoid of the rear-wheel passage switch unit 302 is higher than the second reference current, and when the protrusion amount of the operation rod from the case is larger than the third reference amount, the rear-wheel passage switch unit 302 is in a fourth switch state, in which the fourth communication passage R4 is open. That is, the first communication passage switch valve V1 is closed and the fourth communication passage switch valve V4 is open. This causes the oil in the jack chamber to reach the reservoir chamber through the fourth communication passage R4. In the fourth switch state, the amount of oil in the jack chamber decreases more quickly to decrease the vehicle height more quickly than in the third switch state.

Configuration of Controller 70

The controller 70 will be described below.

FIG. 12 is a block diagram of the controller 70.

The controller 70 includes a CPU, a ROM, and a RAM. The ROM stores programs to be executed in the CPU and various kinds of data. The RAM is used as, for example, an operation memory for the CPU. The controller 70 receives inputs such as signals output from the front-wheel rotation detection sensor 31, the rear-wheel rotation detection sensor 32, the front-wheel relative position detector 281, and the rear-wheel relative position detector 282.

The controller 70 includes a front-wheel rotation speed calculator 71 and a rear-wheel rotation speed calculator 72.

The front-wheel rotation speed calculator 71 calculates the rotation speed of the front wheel 2 based on an output signal from the front-wheel rotation detection sensor 31. The rear-wheel rotation speed calculator 72 calculates the rotation speed of the rear wheel 3 based on an output signal from the rear-wheel rotation detection sensor 32. The front-wheel rotation speed calculator 71 and the rear-wheel rotation speed calculator 72 each obtain a rotation angle based on a pulse signal, which is the output signal from the sensor, and differentiate the rotation angle by time elapsed so as to calculate the rotation speed.

The controller 70 includes a front-wheel displacement amount obtainer 73. The front-wheel displacement amount obtainer 73 obtains a front-wheel displacement amount Lf based on the output signal from the front-wheel relative position detector 281. The front-wheel displacement amount Lf is the amount of displacement of the upper-side end support member 270 of the front-wheel spring length adjustment unit 250 relative to the base member 260. The controller 70 also includes a rear-wheel displacement amount obtainer 74. The rear-wheel displacement amount obtainer 74 obtains a rear-wheel displacement amount Lr based on the output signal from the rear-wheel relative position detector 282. The rear-wheel displacement amount Lr is the amount of displacement of the upper-side end support member 254 of the rear-wheel spring length adjustment unit 252 relative to the base member 253. The front-wheel displacement amount obtainer 73 obtains the front-wheel displacement amount Lf based on a correlation between the impedance of the coil and the front-wheel displacement amount Lf. The rear-wheel displacement amount obtainer 74 obtains the rear-wheel displacement amount Lr based on a correlation between the impedance of the coil and the rear-wheel displacement amount Lr. The correlations are stored in the ROM in advance.

The controller 70 also includes a vehicle speed obtainer 76 to obtain a vehicle speed Vv, which is a traveling speed of the motorcycle 1, based on the rotation speed of the front wheel 2 calculated by the front-wheel rotation speed calculator 71 and/or based on the rotation speed of the rear wheel 3 calculated by the rear-wheel rotation speed calculator 72. The vehicle speed obtainer 76 uses the front-wheel rotation speed Rf or the rear-wheel rotation speed Rr to calculate the traveling speed of the front wheel 2 or the rear wheel 3 so as to obtain the vehicle speed Vv. The traveling speed of the front wheel 2 is calculated using the front-wheel rotation speed Rf and the outer diameter of the tire of the front wheel 2. The moving speed of the rear wheel 3 is calculated using the rear-wheel rotation speed Rr and the outer diameter of the tire of the rear wheel 3. When the motorcycle 1 is traveling in a normal state, it can be construed that the vehicle speed Vv is equal to the traveling speed of the front wheel 2 and/or the traveling speed of the rear wheel 3. Alternatively, the vehicle speed obtainer 76 may use an average value of the front-wheel rotation speed Rf and the rear-wheel rotation speed Rr to calculate an average traveling speed of the front wheel 2 and the rear wheel 3 so as to obtain the vehicle speed Vv.

The controller 70 also includes a passage switch unit controller 77 to control the switch states of the front-wheel passage switch unit 300 and the switch states of the rear-wheel passage switch unit 302 based on the vehicle speed Vv obtained by the vehicle speed obtainer 76. The passage switch unit controller 77 will be detailed later.

The front-wheel rotation speed calculator 71, the rear-wheel rotation speed calculator 72, the front-wheel displacement amount obtainer 73, the rear-wheel displacement amount obtainer 74, the vehicle speed obtainer 76, and the passage switch unit controller 77 are implemented by the CPU executing software stored in storage areas of, for example, the ROM.

The passage switch unit controller 77 of the controller 70 will now be described in detail.

Figure 13:
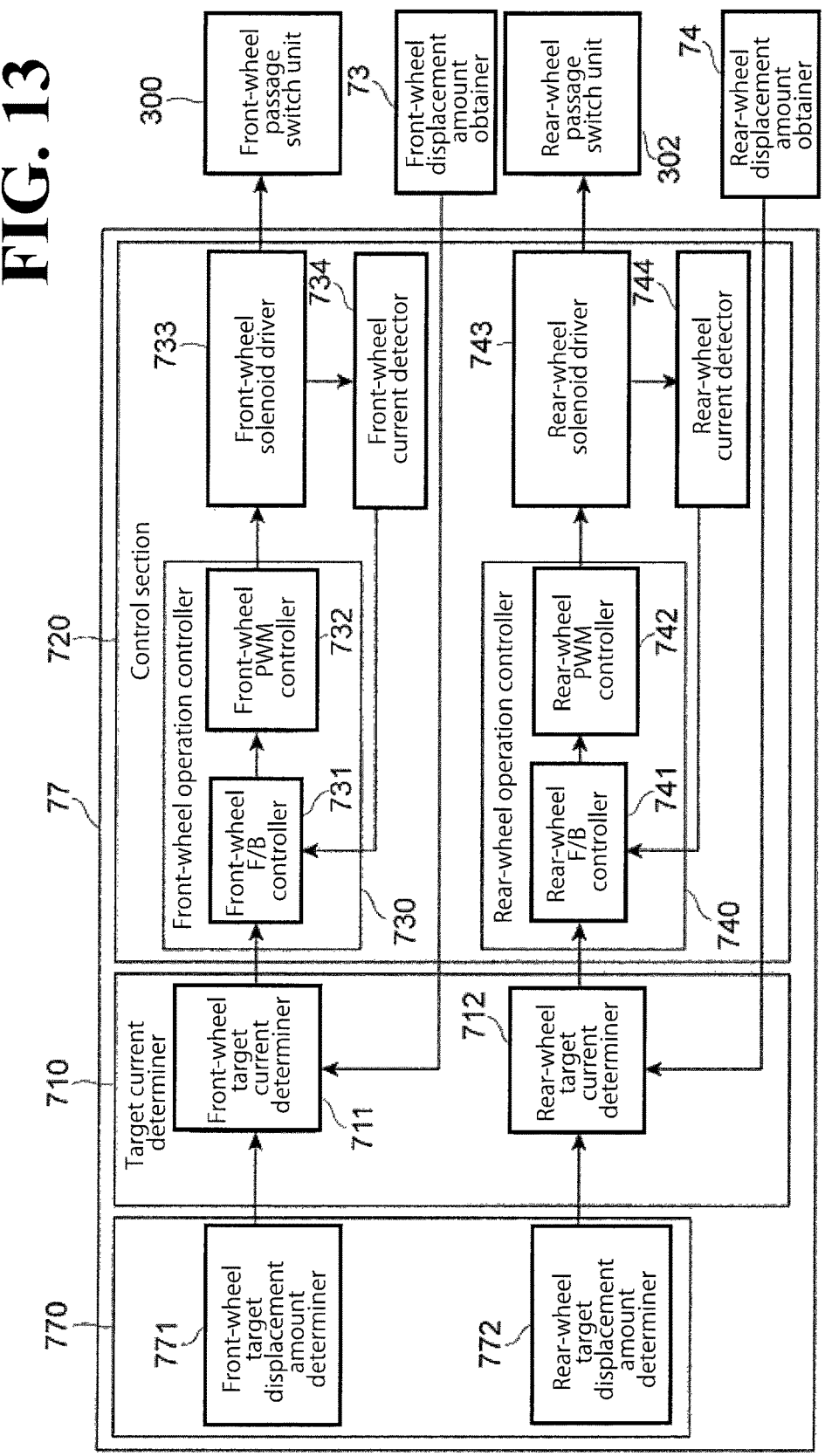
FIG. 13 is a block diagram of a passage switch unit controller.

FIG. 13 is a block diagram of the passage switch unit controller 77.

The passage switch unit controller 77 includes a target displacement amount determiner 770. The target displacement amount determiner 770 includes a front-wheel target displacement amount determiner 771 and a rear-wheel target displacement amount determiner 772. The front-wheel target displacement amount determiner 771 determines a front-wheel target displacement amount Lft, which is a target value of the front-wheel displacement amount Lf. The rear-wheel target displacement amount determiner 772 determines a rear-wheel target displacement amount Lrt, which is a target value of the rear-wheel displacement amount Lr. The passage switch unit controller 77 also includes a target current determiner 710 and a control section 720. The target current determiner 710 determines a target current to be supplied to the front-wheel solenoid 310 of the front-wheel passage switch unit 300 and the rear-wheel solenoid (not illustrated) of the rear-wheel passage switch unit 302. The control section 720 performs control such as feedback control based on the target current determined by the target current determiner 710.

The target displacement amount determiner 770 determines a target displacement amount based on the vehicle speed Vv obtained by the vehicle speed obtainer 76 and based on which control position a vehicle height adjustment switch (not illustrated) of the motorcycle 1 occupies. The vehicle height adjustment switch is what is called a dial switch. The rider of the motorcycle 1 turns the dial of the switch to select between "Low", "Medium", and "High". The vehicle height adjustment switch is disposed in the vicinity of the speedometer, for example After the motorcycle 1 starts traveling, when the vehicle speed Vv obtained by the vehicle speed obtainer 76 is lower than a predetermined upward vehicle speed Vu, the target displacement amount determiner 770 determines the target displacement amount as zero. When the vehicle speed Vv changes from the value lower than the upward vehicle speed Vu to a value equal to or higher than the upward vehicle speed Vu, the target displacement amount determiner 770 determines the target displacement amount as a predetermined value in accordance with the control position of the vehicle height adjustment switch. More specifically, when the vehicle speed Vv changes from the value lower than the upward vehicle speed Vu to a value equal to or higher than the upward vehicle speed Vu, the front-wheel target displacement amount determiner 771 determines the front-wheel target displacement amount Lft as a predetermined front-wheel target displacement amount Lf0 in accordance with the control position of the vehicle height adjustment switch. When the vehicle speed Vv changes from the value lower than the upward vehicle speed Vu to a value equal to or higher than the upward vehicle speed Vu, the rear-wheel target displacement amount determiner 772 determines the rear-wheel target displacement amount Lrt as a predetermined rear-wheel target displacement amount Lr0 in accordance with the control position of the vehicle height adjustment switch. Then, while the vehicle speed Vv obtained by the vehicle speed obtainer 76 is equal to or higher than the upward vehicle speed Vu, the front-wheel target displacement amount determiner 771 determines the front-wheel target displacement amount Lft as the predetermined front-wheel target displacement amount Lf0, and the rear-wheel target displacement amount determiner 772 determines the rear-wheel target displacement amount Lrt as the predetermined rear-wheel target displacement amount Lr0. The ROM stores, in advance, relationships of the control positions of the vehicle height adjustment switch, the predetermined front-wheel target displacement amount Lf0 that accords with the control position, and the predetermined rear-wheel target displacement amount Lr0 that accords with the control position. The vehicle height of the motorcycle 1 is determined in accordance with the front-wheel displacement amount Lf and the rear-wheel displacement amount Lr. In a non-limiting embodiment, a target vehicle height, which is a target value of the vehicle height of the motorcycle 1, is determined in accordance with the control position of the vehicle height adjustment switch. The predetermined front-wheel target displacement amount Lf0 and the predetermined rear-wheel target displacement amount Lr0 in accordance with the target vehicle height are determined in advance and stored in the ROM.

When the vehicle speed Vv of the motorcycle 1 changes from the value equal to or higher than the upward vehicle speed Vu to a value equal to or lower than a predetermined downward vehicle speed Vd, the target displacement amount determiner 770 determines the target displacement amount as zero. That is, the front-wheel target displacement amount determiner 771 and the rear-wheel target displacement amount determiner 772 respectively determine the front-wheel target displacement amount Lft and the rear-wheel target displacement amount Lrt as zero. In a non-limiting example, the upward vehicle speed Vu is 10 km/h, and the downward vehicle speed Vd is 8 km/h.

The target current determiner 710 includes a front-wheel target current determiner 711 and a rear-wheel target current determiner 712. Based on the front-wheel target displacement amount determined by the front-wheel target displacement amount determiner 771, the front-wheel target current determiner 711 determines a front-wheel target current Itf, which is a target current of the front-wheel solenoid 310 of the front-wheel passage switch unit 300. Based on the rear-wheel target displacement amount Lrt determined by the rear-wheel target displacement amount determiner 772, the rear-wheel target current determiner 712 determines a rear-wheel target current Itr, which is a target current of the rear-wheel solenoid of the rear-wheel passage switch unit 302. The front-wheel target current determiner 711 and the rear-wheel target current determiner 712 will be described in detail later.

The control section 720 includes a front-wheel solenoid driver 733, a front-wheel operation controller 730, and a front-wheel current detector 734. The front-wheel solenoid driver 733 drives the front-wheel solenoid 310 of the front-wheel passage switch unit 300. The front-wheel operation controller 730 controls the operation of the front-wheel solenoid driver 733. The front-wheel current detector 734 detects the current flowing to the front-wheel solenoid 310. The control section 720 also includes a rear-wheel solenoid driver 743, a rear-wheel operation controller 740, and a rear-wheel current detector 744. The rear-wheel solenoid driver 743 drives the rear-wheel solenoid. The rear-wheel operation controller 740 controls the operation of the rear-wheel solenoid driver 743. The rear-wheel current detector 744 detects the current flowing to the rear-wheel solenoid.

The front-wheel operation controller 730 includes a front-wheel feedback (F/B) controller 731 and a front-wheel PWM controller 732. The front-wheel feedback controller 731 performs feedback control based on a deviation between the front-wheel target current Itf determined by the front-wheel target current determiner 711 and a current detected by the front-wheel current detector 734 (front-wheel detection current). The front-wheel PWM controller 732 performs PWM control of the front-wheel solenoid 310.

The rear-wheel operation controller 740 includes a rear-wheel feedback (F/B) controller 741 and a rear-wheel PWM controller 742. The rear-wheel feedback controller 741 performs feedback control based on a deviation between the rear-wheel target current Itr determined by the rear-wheel target current determiner 712 and a current detected by the rear-wheel current detector 744 (rear-wheel detection current). The rear-wheel PWM controller 742 performs PWM control of the rear-wheel solenoid.

The front-wheel feedback controller 731 calculates a deviation between the front-wheel target current Itf and the front-wheel detection current detected by the front-wheel current detector 734, and performs feedback processing to make the deviation zero. The rear-wheel feedback controller 741 calculates a deviation between the rear-wheel target current Itr and the rear-wheel detection current detected by the rear-wheel current detector 744, and performs feedback processing to make the deviation zero. In a non-limiting embodiment, the front-wheel feedback controller 731 subjects the deviation between the front-wheel target current Itf and the front-wheel detection current to proportional processing using a proportional element and to integral processing using an integral element, and adds these values together using an adder. The rear-wheel feedback controller 741 subjects the deviation between the rear-wheel target current Itr and the rear-wheel detection current to proportional processing using a proportional element and to integral processing using an integral element, and adds these values together using an adder. In another non-limiting embodiment, the front-wheel feedback controller 731 subjects the deviation between the front-wheel target current Itf and the front-wheel detection current to proportional processing using a proportional element, to integral processing using an integral element, and to differential processing using a differential element, and adds these values together using an adder. The rear-wheel feedback controller 741 subjects the deviation between the rear-wheel target current Itr and the rear-wheel detection current to proportional processing using a proportional element, to integral processing using an integral element, and to differential processing using a differential element, and adds these values together using an adder.

The front-wheel PWM controller 732 changes the duty ratio ($=t/T \times 100(\%)$) of the pulse width (t) in a predetermined cycle (T), and performs PWM control of the opening of the front-wheel solenoid 310 (voltage applied to the coil 311 of the front-wheel solenoid 310). When the PWM control is performed, the voltage is applied to the coil 311 of the front-wheel solenoid 310 in the form of a pulse that accords with the duty ratio. Here, due to the impedance of the coil 311, the current flowing to the coil 311 of the front-wheel solenoid 310 cannot change to follow the voltage applied in the form of a pulse but is output in a weakened form, and the current flowing in the coil 311 of the front-wheel solenoid 310 is increased and decreased in proportion to the duty ratio. In a non-limiting embodiment, when the front-wheel target current Itf is zero, the front-wheel PWM controller 732 sets the duty ratio at zero. When the front-wheel target current Itf is a third reference current, described later, the front-wheel PWM controller 732 sets the duty ratio at 80%.

Similarly, the rear-wheel PWM controller 742 changes the duty ratio and performs PWM control of the opening of the rear-wheel solenoid (voltage applied to the coil of the rear-wheel solenoid). When the PWM control is performed, the voltage is applied to the coil of the rear-wheel solenoid in the form of a pulse that accords with the duty ratio, and the current flowing in the coil of the rear-wheel solenoid is increased and decreased in proportion to the duty ratio. In a non-limiting embodiment, when the rear-wheel target current Itr is zero, the rear-wheel PWM controller 742 sets the duty ratio at zero. When the rear-wheel target current Itr is the third reference current, described later, the rear-wheel PWM controller 742 sets the duty ratio at 80%.

The front-wheel solenoid driver 733 includes, for example, a transistor (FET). The transistor is a switching element connected between the positive electrode line of the power source and the coil 311 of the front-wheel solenoid 310. The front-wheel solenoid driver 733 drives the gate of the transistor to switch the transistor so as to control drive of the front-wheel solenoid 310. The rear-wheel solenoid driver 743 includes, for example, a transistor connected between the positive electrode line of the power source and the coil of the rear-wheel solenoid. The rear-wheel solenoid driver 743 drives the gate of the transistor to switch the transistor so as to control drive of the rear-wheel solenoid.

From voltage across the terminals of a shunt resistor connected to the front-wheel solenoid driver 733, the front-wheel current detector 734 detects the value of the current flowing to the front-wheel solenoid 310. From voltage across the terminals of a shunt resistor connected to the rear-wheel solenoid driver 743, the rear-wheel current detector 744 detects the value of the current flowing to the rear-wheel solenoid.

Next, the front-wheel target current determiner 711 and the rear-wheel target current determiner 712 will be described. Since the processing of determining the rear-wheel target current Itr by the rear-wheel target current determiner 712 is approximately the same as the processing of determining the front-wheel target current Itf by the front-wheel target current determiner 711, description will be made on the processing of determining the front-wheel target current Itf by the front-wheel target current determiner 711 as a representative example FIG. 14 is a graph of a control map schematically illustrating correspondence between a front-wheel displacement amount deviation $\Delta Lf$, described later, and the front-wheel target current Itf.

Figure 14:
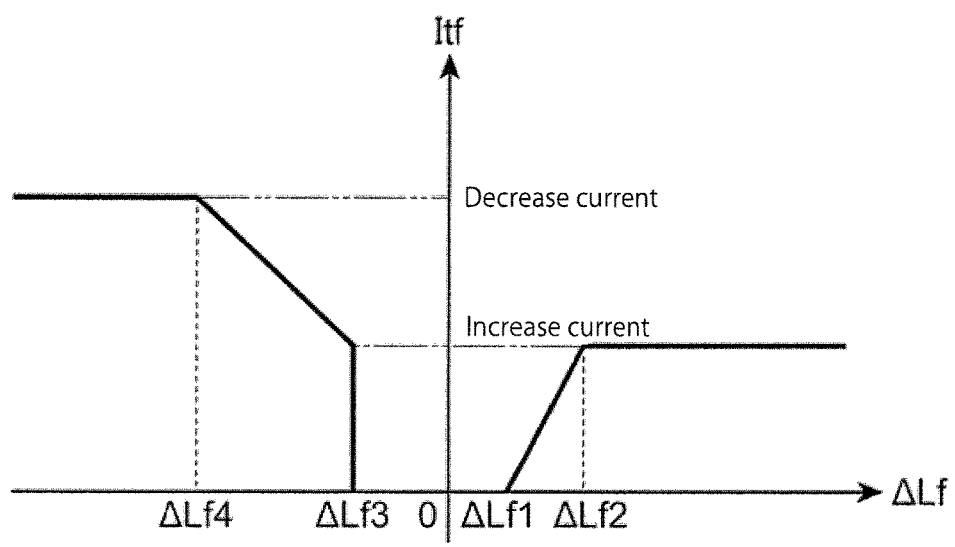
FIG. 14 is a graph of a control map illustrating correspondence between a front-wheel displacement amount deviation and a front-wheel target current.

The front-wheel target current determiner 711 calculates the front-wheel target current Itf based on the control map, an example of which is illustrated in FIG. 14. The control map illustrates correspondence between the front-wheel displacement amount deviation $\Delta Lf$ and the front-wheel target current Itf. The front-wheel displacement amount deviation $\Delta Lf$ (=Lft−Lfa) is obtained by subtracting a front-wheel actual displacement amount Lfa, which is a front-wheel displacement amount Lf obtained by the front-wheel displacement amount obtainer 73, from the front-wheel target displacement amount Lft determined by the front-wheel target displacement amount determiner 771. In a non-limiting example, the front-wheel target current determiner 711 calculates the front-wheel displacement amount deviation $\Delta Lf$ by subtracting the front-wheel actual displacement amount Lfa, which is obtained by the front-wheel displacement amount obtainer 73, from the front-wheel target displacement amount Lft determined by the front-wheel target displacement amount determiner 771. The front-wheel target current determiner 711 calculates the front-wheel target current Itf by substituting the calculated front-wheel displacement amount deviation $\Delta Lf$ into the control map of FIG. 14 illustrating correspondence between the front-wheel displacement amount deviation $\Delta Lf$ and the front-wheel target current Itf. The control map is formed and stored in the ROM in advance.

In the control map of FIG. 14, in an area in which the front-wheel target displacement amount Lft is larger than the front-wheel actual displacement amount Lfa to have a positive (plus) front-wheel displacement amount deviation $\Delta Lf$, the front-wheel target current Itf is set to be zero when the front-wheel displacement amount deviation $\Delta Lf$ is equal to or smaller than a predetermined front-wheel first reference deviation $\Delta Lf1$ (positive value). In the area in which the front-wheel displacement amount deviation $\Delta Lf$ is positive, when the front-wheel displacement amount deviation $\Delta Lf$ is equal to or larger than a predetermined front-wheel second reference deviation $\Delta Lf2$ (positive value), the front-wheel target current Itf is set to be a predetermined increase current set at a value that increases the front-wheel displacement amount Lf. In the area in which the front-wheel displacement amount deviation $\Delta Lf$ is positive, as the front-wheel displacement amount deviation $\Delta Lf$ increases from the front-wheel first reference deviation $\Delta Lf1$ to the front-wheel second reference deviation $\Delta Lf2$, the front-wheel target current Itf is set to gradually increase from zero to the increase current. It is noted that the increase current is a value at which the front-wheel passage switch unit 300 is in the second switch state. In a non-limiting example, the increase current is equal to or higher than the first reference current and equal to or lower than the second reference current. More specifically, the increasing current is 0.5 A, for example. In the following description, a current at which the front-wheel passage switch unit 300 is in the first switch state, which is less than the first reference current, will be occasionally referred to as maintenance current for maintaining the front-wheel displacement amount Lf.

In the control map of FIG. 14, in an area in which the front-wheel target displacement amount Lft is smaller than the front-wheel actual displacement amount Lfa to have a negative (minus) front-wheel displacement amount deviation $\Delta Lf$, the front-wheel target current Itf is set to be zero when the front-wheel displacement amount deviation $\Delta Lf$ is equal to or larger than a predetermined front-wheel third reference deviation $\Delta Lf3$ (negative value). In the area in which the front-wheel displacement amount deviation $\Delta Lf$ is negative, when the front-wheel displacement amount deviation $\Delta Lf$ is equal to or smaller than a predetermined front-wheel fourth reference deviation $\Delta Lf4$ (negative value), the front-wheel target current Itf is set to be a predetermined decrease current set at a value that decreases the front-wheel displacement amount Lf. In the area in which the front-wheel displacement amount deviation $\Delta Lf$ is negative, as the front-wheel displacement amount deviation $\Delta Lf$ increases from the front-wheel fourth reference deviation $\Delta Lf4$ to the front-wheel third reference deviation $\Delta Lf3$, the front-wheel target current Itf is set to gradually decrease from the decrease current to the increase current. It is noted that the decrease current is a value at which the front-wheel passage switch unit 300 is in the third switch state or the fourth switch state. In a non-limiting example, the decrease current is the third reference current, described later.

In the control map of FIG. 14, in the area in which the front-wheel displacement amount deviation $\Delta Lf$ is negative, when the front-wheel displacement amount deviation $\Delta Lf$ is the front-wheel third reference deviation $\Delta Lf3$, the front-wheel target current Itf is set to drastically change from zero to the increase current. This, however, should not be construed in a limiting sense. For example, in the area in which the front-wheel displacement amount deviation ΔLf is negative, as the front-wheel displacement amount deviation ΔLf increases from the front-wheel third reference deviation ΔLf3, the front-wheel target current Itf may be set to gradually decrease from the increase current to zero.

As described above, the front-wheel target current determiner 711 calculates the front-wheel target current Itf by substituting the calculated front-wheel displacement amount deviation ΔLf into the control map of FIG. 14 illustrating correspondence between the front-wheel displacement amount deviation ΔLf and the front-wheel target current Itf. In the following description, this processing will be referred to as normal target-current calculation processing.

Basically, the front-wheel target current determiner 711 determines, as the front-wheel target current Itf, a value obtained by the above-described normal target-current calculation processing. When the front-wheel actual displacement amount Lfa is close to zero and when the front-wheel displacement amount deviation ΔLf is positive (plus) and when the front-wheel target current Itf obtained by the normal target-current calculation processing is the increase current, the front-wheel target current determiner 711 alternately determines the increase current and the maintenance current as the front-wheel target current Itf instead of continuing to determine the increase current as the front-wheel target current Itf.

Description will now be made on the reason and procedure of the front-wheel target current determiner 711 alternately determining the increase current and the maintenance current as the front-wheel target current Itf.

FIG. 15 illustrates the relationship between a protrusion amount of the operation rod 314 and a current supplied to the front-wheel solenoid 310.

From the state in which no current is supplied to the front-wheel solenoid 310, the amount of current supplied to the front-wheel solenoid 310 is increased. Accordingly, the protrusion amount of the operation rod 314 of the front-wheel solenoid 310 from the case 315 gradually increases to bring the transmission member 410 into contact with the push rod 322.

A case of further increasing the amount of current supplied to the front-wheel solenoid 310 after that will be considered.

For example, when a load is mounted on the motorcycle 1, force exerted from the body frame 11 side to the front wheel 2 side becomes larger than when no load is mounted. This decreases the length of the front-wheel spring 500 to make the oil pressure in the jack chamber 60 higher even if the upper-side end support member 270 is at the same position relative to the base member 260 of the front-wheel spring length adjustment unit 250. As the oil pressure in the jack chamber 60 increases, the pressure in the lower-end depression 335 of the valve-body seat member 330 accommodating the valve body 321 increases.

A higher pressure in the lower-end depression 335 of the valve-body seat member 330 makes it more difficult for the valve body 321 to detach from the inclined surface 335a of the lower-end depression 335 of the valve-body seat member 330. This makes opening of the third communication passage switch valve V3 more difficult. In other words, a lower pressure in the lower-end depression 335 of the valve-body seat member 330 makes it easier for the valve body 321 to detach from the inclined surface 335a of the lower-end depression 335 of the valve-body seat member 330. This facilitates opening of the third communication passage switch valve V3.

Consequently, when the amount of current supplied to the front-wheel solenoid 310 is increased after the transmission member 410 is brought into contact with the push rod 322, a higher current is required for starting to open the third communication passage switch valve V3 to decrease the front-wheel actual displacement amount Lfa (lower the vehicle height) as the pressure in the lower-end depression 335 of the valve-body seat member 330 (oil pressure in the jack chamber 60) is higher. Conversely, a lower current is required for starting to open the third communication passage switch valve V3 to decrease the front-wheel actual displacement amount Lfa (lower the vehicle height) as the pressure in the lower-end depression 335 of the valve-body seat member 330 (oil pressure in the jack chamber 60) is lower.

FIG. 15 illustrates, with the solid line, a relationship between an amount of current supplied to the front-wheel solenoid 310 and a protrusion amount of the operation rod 314 when the pressure in the lower-end depression 335 of the valve-body seat member 330 (oil pressure in the jack chamber 60) is considered to be the highest. FIG. 15 illustrates, with the dashed line, a relationship between the amount of current supplied to the front-wheel solenoid 310 and the protrusion amount of the operation rod 314 when the pressure in the lower-end depression 335 is considered to be the lowest.

As illustrated in FIG. 15, even if the amount of current supplied to the front-wheel solenoid 310 is the same, the protrusion amount of the operation rod 314 of the front-wheel solenoid 310 from the case 315 varies in accordance with the pressure in the lower-end depression 335 of the valve-body seat member 330 (oil pressure in the jack chamber 60) after the transmission member 410 is brought into contact with the push rod 322.

Consequently, even if the front-wheel target current Itf to the front-wheel solenoid 310 is the increase current, for example, an amount of current actually supplied to the front-wheel solenoid 310 becomes higher than the increase current. This may cause the protrusion amount of the operation rod 314 of the front-wheel solenoid 310 from the case 315 to be so large that the third communication passage switch valve V3 is open. Particularly, when the pressure in the lower-end depression 335 of the valve-body seat member 330 (oil pressure in the jack chamber 60) is lower, the protrusion amount of the operation rod 314 from the case 315 may become so large that the third communication passage switch valve V3 is open even if the amount of current supplied to the front-wheel solenoid 310 is low.

Even if a value of the increase current for increasing the front-wheel displacement amount Lf (increasing the vehicle height) is set in advance in view of this, such factors as dimensional errors of the component parts and conversion of the vehicle may cause the third communication passage switch valve V3 to be open in spite of the front-wheel target current Itf being the increase current. Even if the front-wheel target current Itf supplied to the front-wheel solenoid 310 is made to be the increase current so as to increase the front-wheel displacement amount Lf (increase the vehicle height), the third communication passage switch valve V3 may be open. Consequently, the oil discharged from the pump 600 may not be supplied to the jack chamber 60, and the front-wheel displacement amount Lf (vehicle height) may not be increased.

Considering the above-described circumstances, the front-wheel target current determiner 711 according to this embodiment determines a value calculated by the normal target-current calculation processing as the final front-wheel target current Itf when a predetermined condition, described later, is not satisfied. When the predetermined condition is satisfied, the front-wheel target current determiner 711 determines a value calculated by lower-limit target-current calculation processing, described later, as the final front-wheel target current Itf. The predetermined condition is that even if the front-wheel target current determiner 711 determines the increase current as the front-wheel target current Itf so as to increase the vehicle height (increase the front-wheel displacement amount Lf), the vehicle height (the front-wheel displacement amount Lf) is not increased. For example, the predetermined condition is that the front-wheel actual displacement amount Lfa is smaller than a predetermined determination threshold, that the front-wheel displacement amount deviation ΔLf is positive, and that the front-wheel target current Itf calculated by the normal target-current calculation processing is the increase current. It is noted that the determination threshold is set to be such a value as to increase the pressure in the lower-end depression 335 of the valve-body seat member 330 (oil pressure in the jack chamber 60) not to increase the protrusion amount of the operation rod 314 of the front-wheel solenoid 310 from the case 315 to such an extent as to open the third communication passage switch valve V3 even if the front-wheel target current Itf is the increase current.

When the front-wheel actual displacement amount Lfa is equal to or larger than the determination threshold, the pressure in the lower-end depression 335 of the valve-body seat member 330 (oil pressure in the jack chamber 60) is higher than when the front-wheel actual displacement amount Lfa is less than the determination threshold. When the front-wheel actual displacement amount Lfa is equal to or larger than the determination threshold, it is considered that even if the front-wheel target current Itf is the increase current, the protrusion amount of the operation rod 314 of the front-wheel solenoid 310 from the case 315 will not be so large that the third communication passage switch valve V3 is open. Therefore, the front-wheel target current determiner 711 determines the front-wheel target current Itf calculated by the normal target-current calculation processing as the final front-wheel target current Itf.

When the front-wheel displacement amount deviation ΔLf is negative or when the front-wheel target current Itf calculated by the normal target-current calculation processing is not the increase current even though the front-wheel displacement amount deviation ΔLf is positive, the front-wheel target current determiner 711 determines the front-wheel target current Itf calculated by the normal target-current calculation processing as the final front-wheel target current Itf.

The solid line in FIG. 15 indicates the case in which the pressure in the lower-end depression 335 of the valve-body seat member 330 (oil pressure in the jack chamber 60) is the highest. In this case, an amount of current supplied to the front-wheel solenoid 310 that makes the operation rod 314 protrude to such an extent that the third communication passage switch valve V3 is opened to shift the front-wheel solenoid 310 to the third switch state is referred to as third reference current. In a non-limiting example, the third reference current is 2.5 A.

FIG. 16A and FIG. 16B illustrate the lower-limit target-current calculation processing performed by the front-wheel target current determiner 711. FIG. 16A is a graph of a change in the front-wheel target current Itf, and FIG. 16B is a graph of a change in the front-wheel actual displacement amount Lfa.

The lower-limit target-current calculation processing performed by the front-wheel target current determiner 711 will now be described.

In the lower-limit target-current calculation processing, as illustrated in FIG. 16A, the front-wheel target current determiner 711 determines the increase current and the maintenance current alternately as the front-wheel target current Itf so as to supply the increase current intermittently. More specifically, a formula is determined in advance as a relational expression between elapsed time t after the predetermined condition is satisfied and the front-wheel target current Itf. The front-wheel target current determiner 711 substitutes elapsed time t into the predetermined formula to calculate the front-wheel target current Itf and finally determines a resultant value as the front-wheel target current Itf.

It is noted that the predetermined formula is not particularly limited insofar as the front-wheel target current Itf is alternately the increase current and the maintenance current in a period of time in which the predetermined condition is satisfied. For example, with a first embodiment of the predetermined formula, as illustrated in FIG. 16A, the following cycle is repeated: the front-wheel target current Itf is gradually increased from zero to the increase current; the increased current is maintained for a first predetermined period of time; the front-wheel target current Itf is gradually decreased from the increase current to zero; zero is maintained for a second predetermined period of time; and the front-wheel target current Itf is gradually increased from zero to the increase current. The predetermined formula illustrated in FIG. 16A makes the front-wheel target current Itf change in such a trapezoidal pattern that the increase current is maintained for the first predetermined period of time. The first predetermined period of time and the second predetermined period of time may be equal to each other. The second predetermined period of time may be zero.

Next, using a flowchart, a procedure of front-wheel target current determination processing performed by the front-wheel target current determiner 711 will be described.

Figure 17:
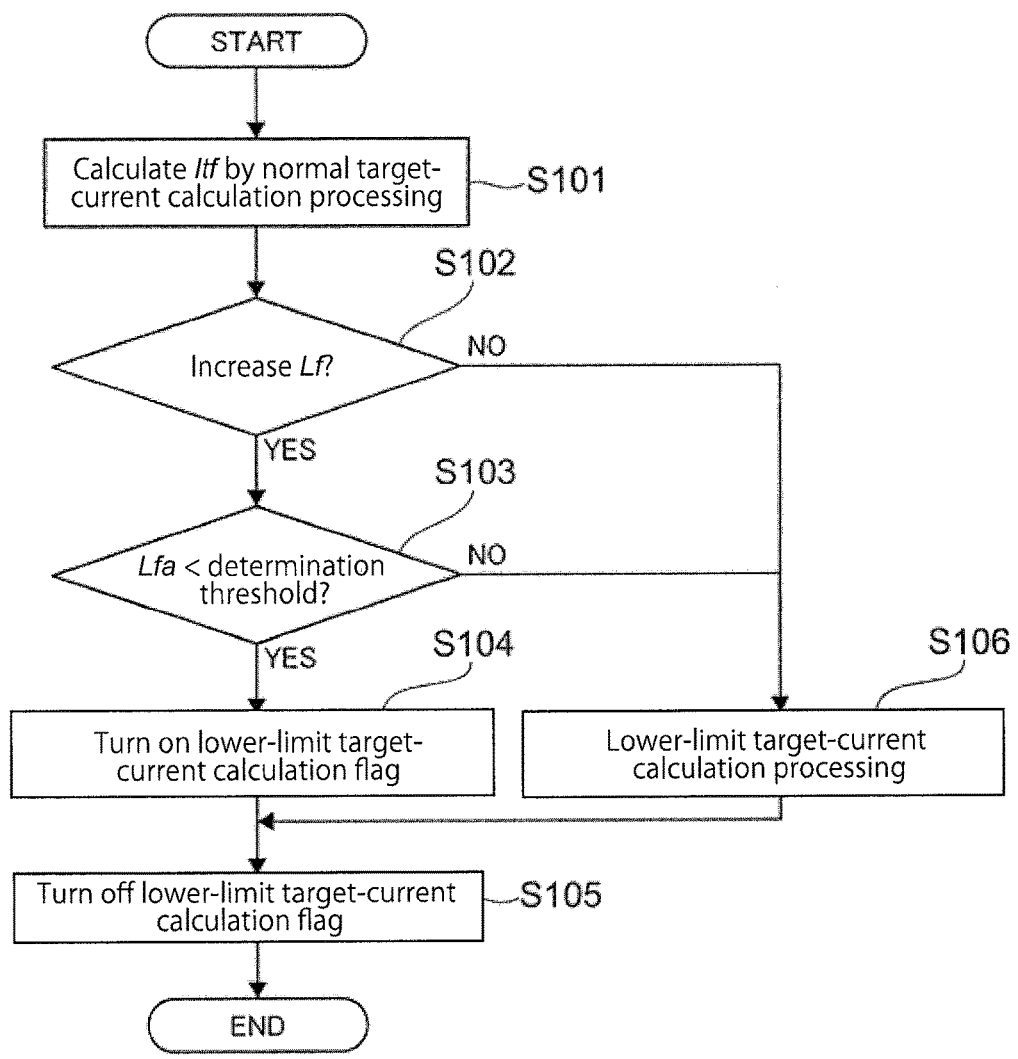
FIG. 17 is a flowchart of a procedure for front-wheel target current determination processing for determining the front-wheel target current by the front-wheel target current determiner.

FIG. 17 is the flowchart of the procedure of front-wheel target current determination processing of determining the front-wheel target current Itf by the front-wheel target current determiner 711.

The front-wheel target current determiner 711 repeatedly performs the front-wheel target current determination processing at a predetermined cycle (4 msec, for example).

First, the front-wheel target current determiner 711 calculates a front-wheel target current Itf by the normal target-current calculation processing (S101). Then, the front-wheel target current determiner 711 makes a determination as to whether the situation is for increasing a front-wheel displacement amount Lf (S102). When a front-wheel displacement amount deviation ΔLf is positive and when the front-wheel target current Itf calculated at S101 is the increase current, the front-wheel target current determiner 711 determines that the situation is for increasing the front-wheel displacement amount Lf.

When the front-wheel target current determiner 711 determines that the situation is for increasing the front-wheel displacement amount Lf (YES at S102), the front-wheel target current determiner 711 makes a determination as to whether a front-wheel actual displacement amount Lfa obtained by the front-wheel displacement amount obtainer 73 is smaller than the predetermined determination threshold (S103).

When the front-wheel target current determiner 711 determines that the front-wheel actual displacement amount Lfa is smaller than the predetermined determination threshold (YES at S103), the front-wheel target current determiner 711 turns on a lower-limit target-current calculation flag in setting the flag in the RAM (hereinafter occasionally referred to as "flag setting") (S104), and performs the lower-limit target-current calculation processing (S105).

When the front-wheel target current determiner 711 determines that the situation is not for increasing the front-wheel displacement amount Lf (NO at S102) or when the front-wheel target current determiner 711 determines that the front-wheel actual displacement amount Lfa is not smaller than the predetermined determination threshold (NO at S103), the front-wheel target current determiner 711 turns off the lower-limit target-current calculation flag in the flag setting (S106), and performs the lower-limit target-current calculation processing (S105).

Next, using a flowchart, a procedure of the lower-limit target-current calculation processing performed by the front-wheel target current determiner 711 will be described.

Figure 18:
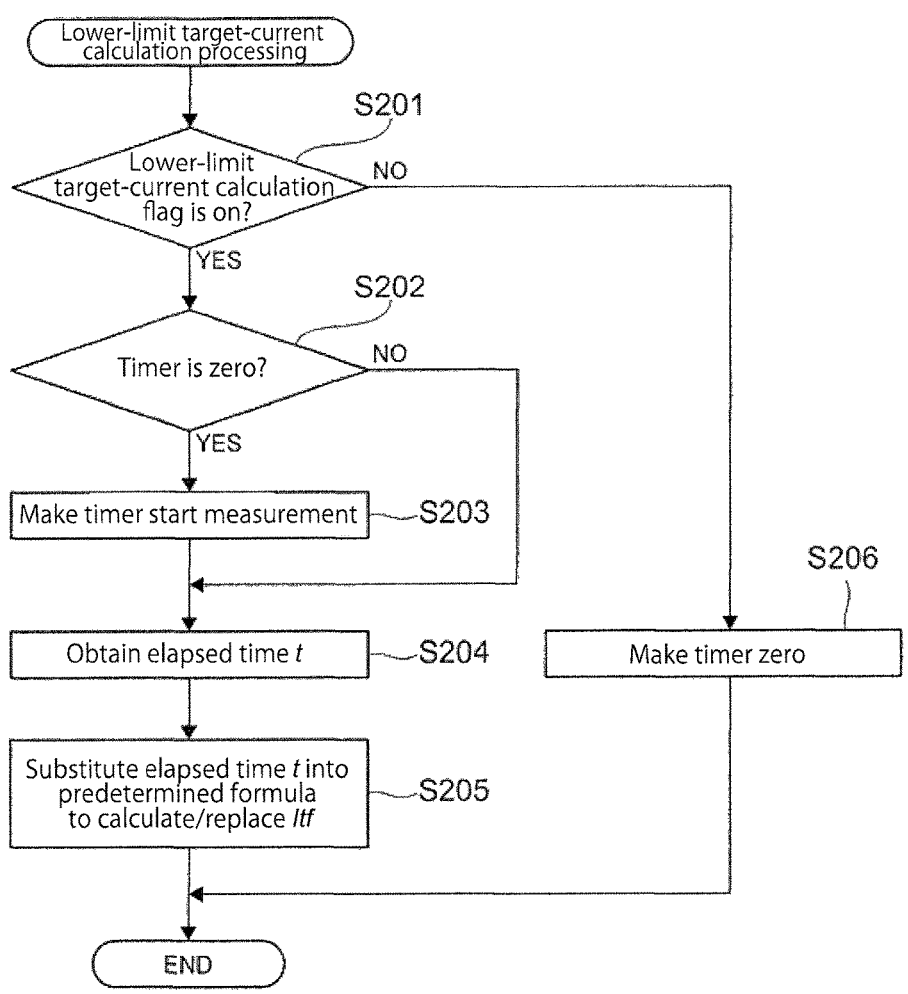
FIG. 18 is a flowchart of a procedure for the lower-limit target-current calculation processing performed by the front-wheel target current determiner.

FIG. 18 is the flowchart of the procedure of the lower-limit target-current calculation processing (S105 in FIG. 17) performed by the front-wheel target current determiner 711.

First, in the flag setting, the front-wheel target current determiner 711 makes a determination as to whether the lower-limit target-current calculation flag is on (S201). When the lower-limit target-current calculation flag is on (YES at S201), the front-wheel target current determiner 711 makes a determination as to whether a timer to measure elapsed time t after the lower-limit target-current calculation flag is turned on is zero (S202). When the timer is zero (YES at S202), the front-wheel target current determiner 711 makes the timer start measurement (S203).

After the timer starts measurement at S203 or when the timer is not zero (NO at S202), the front-wheel target current determiner 711 obtains the elapsed time t of the timer (S204).

Then, the front-wheel target current determiner 711 substitutes the elapsed time t obtained at S204 into the predetermined formula to calculate the front-wheel target current Itf, and determines the calculated front-wheel target current Itf as the final front-wheel target current Itf instead of the front-wheel target current Itf calculated by the normal target-current calculation processing of S101 in FIG. 17 (replaces the front-wheel target current Itf) (S205).

When the lower-limit target-current calculation flag is not on (NO at S201), the front-wheel target current determiner 711 makes the timer zero (S206), and ends the processing. Thus, when the lower-limit target-current calculation flag is off, the front-wheel target current determiner 711 determines the front-wheel target current Itf calculated by the normal target-current calculation processing of S101 in FIG. 17 as the final front-wheel target current Itf.

Since the front-wheel target current determiner 711 determines the front-wheel target current Itf in the manner described heretofore, the front-wheel target current determiner 711 does not continue to make the front-wheel target current Itf the increase current in the period of time in which the predetermined condition is satisfied. Therefore, even if the protrusion amount of the operation rod 314 of the front-wheel solenoid 310 from the case 315 is so large that the third communication passage switch valve V3 is open when the front-wheel target current determiner 711 makes the front-wheel target current Itf the increase current, the front-wheel target current Itf is immediately decreased to the maintenance current so as to decrease the protrusion amount of the operation rod 314 from the case 315. As a result, when the front-wheel target current determiner 711 makes the front-wheel target current Itf the increase current, the protrusion amount of the operation rod 314 from the case 315 does not continue to be so large that the third communication passage switch valve V3 is open. Consequently, with the configuration according to this embodiment, when the vehicle height is to be increased (when the front-wheel target current determiner 711 makes the front-wheel target current Itf the increase current), the oil discharged from the pump 600 is supplied to the jack chamber 60 so reliably that the vehicle height is increased with improved reliability.

The predetermined formula for the front-wheel target current determiner 711 to calculate the front-wheel target current Itf when the predetermined condition is satisfied is determined in advance as the relational expression between the elapsed time t after the predetermined condition is satisfied and the front-wheel target current Itf. It is noted that the predetermined formula is not particularly limited insofar as the front-wheel target current Itf changes between the increase current and the maintenance current alternately.

Second Embodiment of Predetermined Formula

Figure 19A:
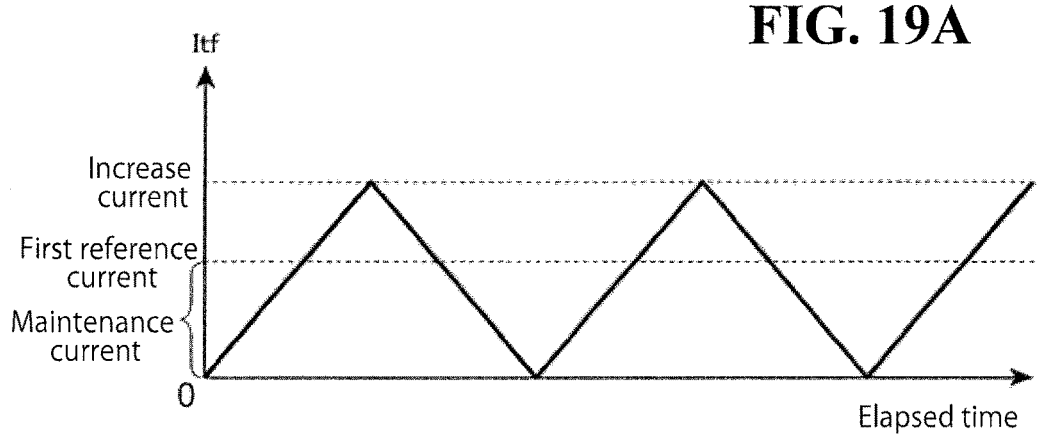
FIG. 19A illustrates a second embodiment of a predetermined formula.

FIG. 19A illustrates a second embodiment of the predetermined formula.

As illustrated in FIG. 19A, the second embodiment of the predetermined formula makes the front-wheel target current Itf change in a triangular pattern. In a non-limiting example, the second embodiment of the predetermined formula is different from the first embodiment of the predetermined formula in FIG. 16A in that the first predetermined period of time and the second predetermined period of time are zero.

Third Embodiment of Predetermined Formula

Figure 19B:
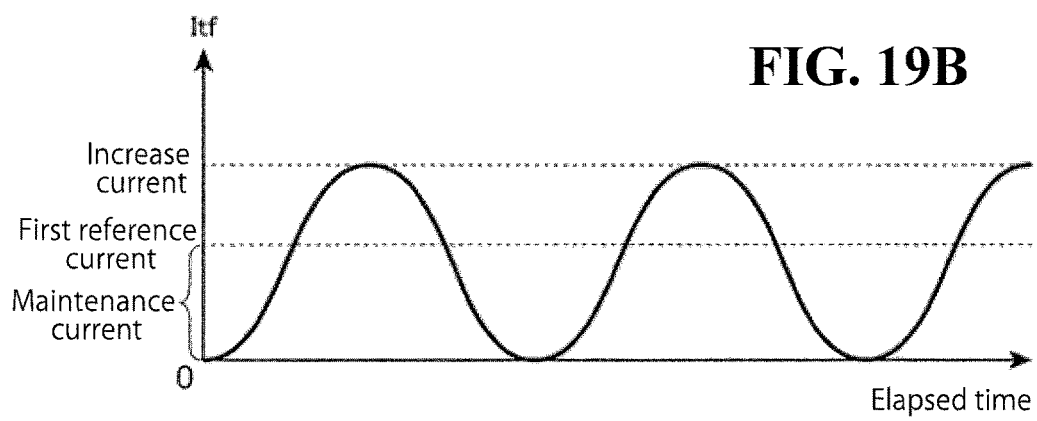
FIG. 19B illustrates a third embodiment of a predetermined formula.

FIG. 19B illustrates a third embodiment of the predetermined formula.

As illustrated in FIG. 19B, the third embodiment of the predetermined formula makes the front-wheel target current Itf change in a triangular wave pattern.

Fourth Embodiment of Predetermined Formula

Figure 19C:
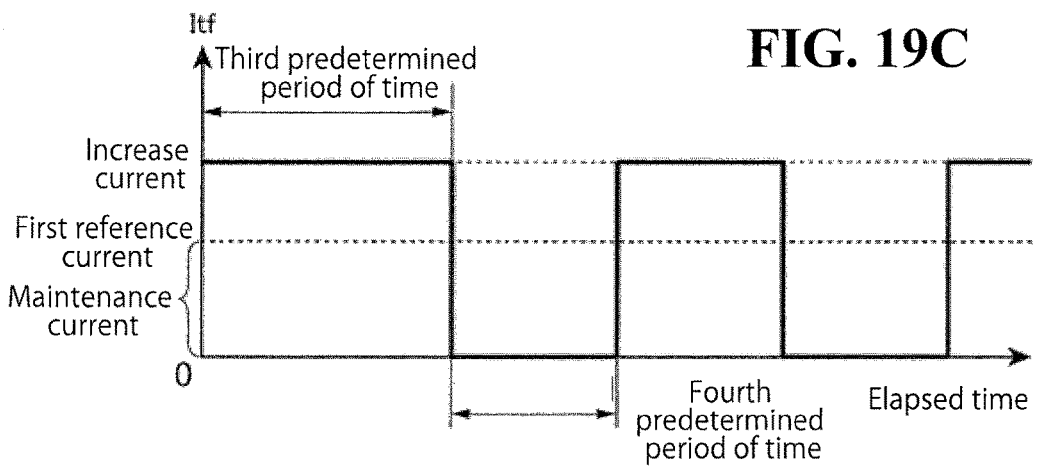
FIG. 19C illustrates a fourth embodiment of a predetermined formula.

FIG. 19C illustrates a fourth embodiment of the predetermined formula.

As illustrated in FIG. 19C, the fourth embodiment of the predetermined formula makes the front-wheel target current Itf change in such a rectangular pattern as follows: immediately after the predetermined condition is satisfied, the front-wheel target current Itf is made to be the increase current; the increase current is maintained for a third predetermined period of time; the front-wheel target current Itf is changed to zero; zero is maintained for a fourth predetermined period of time; and the front-wheel target current Itf is made to be the increase current. The third predetermined period of time and the fourth predetermined period of time may be equal to each other.

The embodiments increase the vehicle height with improved reliability.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A vehicle height adjustment device comprising:
   an actuator driven when supplied with a current and configured to change a relative position of a body of a vehicle relative to an axle of a wheel of the vehicle;
   a detector configured to detect the relative position; and
   a controller configured to control the current supplied to the actuator to make the relative position equal to a target value so as to adjust a vehicle height of the body, wherein
   the controller is configured to alternately supply an increase current and a maintenance current to the actuator when a detection value of the detector is smaller than a predetermined threshold, the increase current increasing the relative position to increase the vehicle height, the maintenance current maintaining the relative position to maintain the vehicle height, and
   the controller is configured to set the maintenance current to be less than a predetermined first reference current, the controller is configured to set the increase current to be equal to or higher than the first reference current and equal to or lower than a predetermined second reference current, which is determined in advance to be higher than the first reference current, and the controller is configured to set a decrease current to be higher than the second reference current, the decrease current decreasing the relative position to decrease the vehicle height.

2. The vehicle height adjustment device according to claim 1, further comprising:
   a spring comprising one end supported on a body side and another end supported on a wheel side;
   an adjustor comprising an accommodation chamber to accommodate a fluid and configured to adjust a length of the spring in accordance with an amount of the fluid in the accommodation chamber;
   a storage chamber to store the fluid; and
   a pump comprising a cylinder and configured to take the fluid stored in the storage chamber into the cylinder when a relative distance between the body and the wheel is increased and configured to discharge the fluid from the cylinder when the relative distance between the body and the wheel is decreased,
   wherein when the detection value of the detector is equal to or larger than the predetermined threshold, the actuator is supplied with the maintenance current to shift to a state in which the fluid discharged from the pump is guided to the storage chamber to maintain the amount of the fluid in the accommodation chamber, the actuator is supplied with the increase current to shift to a state in which the fluid discharged from the pump is guided to the accommodation chamber to increase the amount of the fluid in the accommodation chamber, and the actuator is supplied with the decrease current to shift to a state in which the fluid in the accommodation chamber is guided to the storage chamber to decrease the amount of the fluid in the accommodation chamber.

3. The vehicle height adjustment device according to claim 1, wherein the controller is configured to change the current supplied to the actuator in such a pattern as a trapezoidal pattern, a triangular pattern, and a triangular wave pattern to alternately supply the increase current and the maintenance current when the detection value of the detector is smaller than the predetermined threshold.

4. The vehicle height adjustment device according to claim 3, further comprising:
   a spring comprising one end supported on a body side and another end supported on a wheel side;
   an adjustor comprising an accommodation chamber to accommodate a fluid and configured to adjust a length of the spring in accordance with an amount of the fluid in the accommodation chamber;
   a storage chamber to store the fluid; and
   a pump comprising a cylinder and configured to take the fluid stored in the storage chamber into the cylinder when a relative distance between the body and the wheel is increased and configured to discharge the fluid from the cylinder when the relative distance between the body and the wheel is decreased,
   wherein when the detection value of the detector is equal to or larger than the predetermined threshold, the actuator is supplied with the maintenance current to shift to a state in which the fluid discharged from the pump is guided to the storage chamber to maintain the amount of the fluid in the accommodation chamber, the actuator is supplied with the increase current to shift to a state in which the fluid discharged from the pump is guided to the accommodation chamber to increase the amount of the fluid in the accommodation chamber, and the actuator is supplied with the decrease current to shift to a state in which the fluid in the accommodation chamber is guided to the storage chamber to decrease the amount of the fluid in the accommodation chamber.

5. The vehicle height adjustment device according to claim 1,
   wherein the controller is configured to change the current supplied to the actuator in such a pattern as a trapezoidal pattern, a triangular pattern, and a triangular wave pattern to alternately supply the increase current and the maintenance current when a deviation obtained by subtracting the detection value of the detector from the target value of the relative position is positive and larger than a predetermined reference deviation, and the detection value of the detector is smaller than the predetermined threshold.

6. The vehicle height adjustment device according to claim 5, further comprising:
   a spring comprising one end supported on a body side and another end supported on a wheel side;
   an adjustor comprising an accommodation chamber to accommodate a fluid and configured to adjust a length of the spring in accordance with an amount of the fluid in the accommodation chamber;
   a storage chamber to store the fluid; and
   a pump comprising a cylinder and configured to take the fluid stored in the storage chamber into the cylinder when a relative distance between the body and the wheel is increased and configured to discharge the fluid from the cylinder when the relative distance between the body and the wheel is decreased,
   wherein when the detection value of the detector is equal to or larger than the predetermined threshold, the actuator is supplied with the maintenance current to shift to a state in which the fluid discharged from the pump is guided to the storage chamber to maintain the amount of the fluid in the accommodation chamber, the actuator is supplied with the increase current to shift to a state in which the fluid discharged from the pump is guided to the accommodation chamber to increase the amount of the fluid in the accommodation chamber, and the actuator is supplied with the decrease current to shift to a state in which the fluid in the accommodation chamber is guided to the storage chamber to decrease the amount of the fluid in the accommodation chamber.

7. A vehicle height adjustment device comprising:
an actuator driven when supplied with a current and configured to change a relative position of a body of a vehicle relative to an axle of a wheel of the vehicle;
a detector configured to detect the relative position and provide a detection value in response; and
a controller configured to control the current supplied to the actuator to make the relative position equal to a target value so as to adjust a vehicle height of the body, wherein
the controller is configured to alternately supply an increase current and a maintenance current to the actuator, when a deviation obtained by subtracting the detection value of the detector from the target value of the relative position is positive and larger than a predetermined reference deviation, and the detection value of the detector is smaller than a predetermined threshold,
the increase current is a current that increases the relative position to increase the vehicle height,
the maintenance current is a current that maintains the relative position to maintain the vehicle height, and
the controller is configured to set the maintenance current to be less than a predetermined first reference current, the controller is configured to set the increase current to be equal to or higher than the first reference current and equal to or lower than a predetermined second reference current, which is determined in advance to be higher than the first reference current, and the controller is configured to set a decrease current to be higher than the second reference current, the decrease current decreasing the relative position to decrease the vehicle height.

8. The vehicle height adjustment device according to claim 7, further comprising:
a spring comprising one end supported on a body side and another end supported on a wheel side;
an adjustor comprising an accommodation chamber to accommodate a fluid and configured to adjust a length of the spring in accordance with an amount of the fluid in the accommodation chamber;
a storage chamber to store the fluid; and
a pump comprising a cylinder and configured to take the fluid stored in the storage chamber into the cylinder when a relative distance between the body and the wheel is increased and configured to discharge the fluid from the cylinder when the relative distance between the body and the wheel is decreased,
wherein when the detection value of the detector is equal to or larger than the predetermined threshold, the actuator is supplied with the maintenance current to shift to a state in which the fluid discharged from the pump is guided to the storage chamber to maintain the amount of the fluid in the accommodation chamber, the actuator is supplied with the increase current to shift to a state in which the fluid discharged from the pump is guided to the accommodation chamber to increase the amount of the fluid in the accommodation chamber, and the actuator is supplied with the decrease current to shift to a state in which the fluid in the accommodation chamber is guided to the storage chamber to decrease the amount of the fluid in the accommodation chamber.

9. A vehicle height adjustment device comprising:
an actuator driven when supplied with a current and configured to change a relative position of a body of a vehicle relative to an axle of a wheel of the vehicle;
a detector configured to detect the relative position and provide a detection value in response; and
a controller configured to control the current supplied to the actuator to make the relative position equal to a target value so as to adjust a vehicle height of the body, wherein
the controller is configured to alternately supply an increase current and a maintenance current to the actuator, when a deviation obtained by subtracting the detection value of the detector from the target value of the relative position is positive and larger than a predetermined reference deviation, and the detection value of the detector is smaller than a predetermined threshold,
the increase current is a current that increases the relative position to increase the vehicle height, and
the maintenance current is a current that maintains the relative position to maintain the vehicle height,
the controller is configured to supply the increase current to the actuator when the deviation obtained by subtracting the detection value of the detector from the target value of the relative position is larger than the predetermined reference deviation and when the detection value of the detector is equal to or larger than the predetermined threshold, and
the controller is configured to set the maintenance current to be less than a predetermined first reference current, the controller is configured to set the increase current to be equal to or higher than the first reference current and equal to or lower than a predetermined second reference current, which is determined in advance to be higher than the first reference current, and the controller is configured to set a decrease current to be higher than the second reference current, the decrease current decreasing the relative position to decrease the vehicle height.

10. The vehicle height adjustment device according to claim 9, further comprising:
a spring comprising one end supported on a body side and another end supported on a wheel side;
an adjustor comprising an accommodation chamber to accommodate a fluid and configured to adjust a length of the spring in accordance with an amount of the fluid in the accommodation chamber;
a storage chamber to store the fluid; and
a pump comprising a cylinder and configured to take the fluid stored in the storage chamber into the cylinder when a relative distance between the body and the wheel is increased and configured to discharge the fluid from the cylinder when the relative distance between the body and the wheel is decreased,
wherein when the detection value of the detector is equal to or larger than the predetermined threshold, the actuator is supplied with the maintenance current to shift to a state in which the fluid discharged from the pump is guided to the storage chamber to maintain the amount of the fluid in the accommodation chamber, the actuator is supplied with the increase current to shift to a state in which the fluid discharged from the pump is guided to the accommodation chamber to increase the amount of the fluid in the accommodation chamber, and the actuator is supplied with the decrease current to shift to a state in which the fluid in the accommodation chamber is guided to the storage chamber to decrease the amount of the fluid in the accommodation chamber.

11. The vehicle height adjustment device according to claim 9, wherein the controller is configured to change the current supplied to the actuator in such a pattern as a trapezoidal pattern, a triangular pattern, and a triangular wave pattern to alternately supply the increase current and the maintenance current when the detection value of the detector is smaller than the predetermined threshold.

12. The vehicle height adjustment device according to claim 11, further comprising:
- a spring comprising one end supported on a body side and another end supported on a wheel side;
- an adjustor comprising an accommodation chamber to accommodate a fluid and configured to adjust a length of the spring in accordance with an amount of the fluid in the accommodation chamber;
- a storage chamber to store the fluid; and
- a pump comprising a cylinder and configured to take the fluid stored in the storage chamber into the cylinder when a relative distance between the body and the wheel is increased and configured to discharge the fluid from the cylinder when the relative distance between the body and the wheel is decreased, wherein when the detection value of the detector is equal to or larger than the predetermined threshold, the actuator is supplied with the maintenance current to shift to a state in which the fluid discharged from the pump is guided to the storage chamber to maintain the amount of the fluid in the accommodation chamber, the actuator is supplied with the increase current to shift to a state in which the fluid discharged from the pump is guided to the accommodation chamber to increase the amount of the fluid in the accommodation chamber, and the actuator is supplied with the decrease current to shift to a state in which the fluid in the accommodation chamber is guided to the storage chamber to decrease the amount of the fluid in the accommodation chamber.

* * * * *